(12) United States Patent
Ueda et al.

(10) Patent No.: US 10,680,238 B2
(45) Date of Patent: Jun. 9, 2020

(54) METHOD TO PREPARE COMPOSITE GRAPHITE PARTICLES FOR NONAQUEOUS SECONDARY BATTERY NEGATIVE ELECTRODE, ACTIVE MATERIAL FOR NONAQUEOUS SECONDARY BATTERY NEGATIVE ELECTRODE, AND NONAQUEOUS SECONDARY BATTERY

(71) Applicant: Mitsubishi Chemical Corporation, Chiyoda-ku (JP)

(72) Inventors: Akio Ueda, Inashiki-gun (JP); Satoshi Akasaka, Inashiki-gun (JP); Nobuyuki Ishiwatari, Inashiki-gun (JP); Junko Kagimoto, Chiyoda-ku (JP); Shingo Morokuma, Inashiki-gun (JP)

(73) Assignee: Mitsubishi Chemical Corporation, Chiyoda-ku (JP)

( * ) Notice: Subject to any disclaimer, the term of this patent is extended or adjusted under 35 U.S.C. 154(b) by 57 days.

(21) Appl. No.: 16/159,457

(22) Filed: Oct. 12, 2018

(65) Prior Publication Data

US 2019/0088934 A1 Mar. 21, 2019

Related U.S. Application Data

(63) Continuation of application No. 15/275,824, filed on Sep. 26, 2016, now abandoned, which is a (Continued)

(30) Foreign Application Priority Data

Mar. 26, 2014 (JP) .................................. 2014-064534

(51) Int. Cl.
*H01M 4/36* (2006.01)
*H01M 4/587* (2010.01)
(Continued)

(52) U.S. Cl.
CPC ........... *H01M 4/364* (2013.01); *H01M 4/133* (2013.01); *H01M 4/134* (2013.01); *H01M 4/38* (2013.01);
(Continued)

(58) Field of Classification Search
None
See application file for complete search history.

(56) References Cited

U.S. PATENT DOCUMENTS

2010/0273058 A1 10/2010 Lee et al.
2012/0219858 A1 8/2012 Nakabayashi et al.
(Continued)

FOREIGN PATENT DOCUMENTS

CN 101449410 A 6/2009
CN 102651467 A 8/2012
(Continued)

OTHER PUBLICATIONS

Japanese Office Action dated Oct. 29, 2019, in Patent Application No. 2016-510463, 8 pages (with unedited computer generated English translation).
(Continued)

*Primary Examiner* — Sarah A. Slifka
(74) *Attorney, Agent, or Firm* — Oblon, McClelland, Maier & Neustadt, L.L.P.

(57) ABSTRACT

The invention includes a method to provide composite graphite particles for a nonaqueous secondary battery negative electrode, wherein metal particles capable of alloying with Li can be internally present with favorable dispersibility. The present invention relates to composite graphite particles for a nonaqueous secondary battery negative electrode containing graphite (A) and metal particles (B) capable
(Continued)

of alloying with Li, wherein the degree of dispersion of the metal particles (B) in the composite graphite particles is 0.78 or more.

4 Claims, 1 Drawing Sheet

Related U.S. Application Data continuation of application No. PCT/JP2015/059287, filed on Mar. 26, 2015.

(51) Int. Cl.
    *H01M 4/133*    (2010.01)
    *H01M 4/134*    (2010.01)
    *H01M 10/0525*  (2010.01)
    *H01M 4/38*     (2006.01)
    *H01M 4/62*     (2006.01)
    *H01M 10/0566*  (2010.01)

(52) U.S. Cl.
    CPC .......... *H01M 4/386* (2013.01); *H01M 4/587* (2013.01); *H01M 10/0525* (2013.01); *H01M 4/62* (2013.01); *H01M 4/622* (2013.01); *H01M 4/625* (2013.01); *H01M 10/0566* (2013.01); *Y02T 10/7011* (2013.01)

(56) References Cited

U.S. PATENT DOCUMENTS

2013/0302675 A1   11/2013   Kouzu et al.
2014/0227600 A1   8/2014   Kachi
2015/0194668 A1   7/2015   Ueda et al.

FOREIGN PATENT DOCUMENTS

| CN | 103262314 A | 8/2013 |
|---|---|---|
| JP | 2003-223892 | 8/2003 |
| JP | 2005-243508 | 9/2005 |
| JP | 2008-27897 | 2/2008 |
| JP | 2008-186732 | 8/2008 |
| JP | 2009-535776 | 10/2009 |
| JP | 2012-43546 | 3/2012 |
| JP | 2012-43547 A | 3/2012 |
| JP | 2012-124116 | 6/2012 |
| JP | 2012-124121 | 6/2012 |
| JP | 2013-219018 A | 10/2013 |
| JP | 2014-22041 | 2/2014 |
| JP | 2014-203545 | 10/2014 |
| WO | WO 2013/027686 A1 | 2/2013 |
| WO | WO 2013/141104 A1 | 9/2013 |
| WO | WO 2014/046144 A1 | 3/2014 |

OTHER PUBLICATIONS

International Search Report dated May 12, 2015 in PCT/JP2015/059287, Filed on Mar. 26, 2015.
Jong-Hyuk Lee, et al., "Spherical silicon/graphite/carbon composites as anode material for lithium-ion batteries", Journal of Power Sources, vol. 176 No. 1, XP022397050, Oct. 18, 2007, pp. 353-358.
Office Action dated Jan. 8, 2019 in Japanese Patent Application No. 2016-510463 with unedited computer generated English translation.
Combined Office Action and Search Report dated Sep. 4, 2018 in Chinese Patent Application No. 201580016297.3 (with English translation), 18 pages.

METHOD TO PREPARE COMPOSITE GRAPHITE PARTICLES FOR NONAQUEOUS SECONDARY BATTERY NEGATIVE ELECTRODE, ACTIVE MATERIAL FOR NONAQUEOUS SECONDARY BATTERY NEGATIVE ELECTRODE, AND NONAQUEOUS SECONDARY BATTERY

CROSS-REFERENCE TO RELATED APPLICATIONS

This application is a continuation application of prior U.S. application Ser. No. 15/275,824, filed Sep. 26, 2016, the disclosure of which is incorporated herein by reference in its entirety. U.S. application Ser. No. 15/275,824 is a continuation application of PCT/JP2015/059287, filed Mar. 26, 2015, the disclosure of which is incorporated herein by reference in its entirety. U.S. application Ser. No. 15/275,824 claims priority to Japanese Application No. 2014-064534, filed Mar. 26, 2014, the disclosure of which is incorporated herein by reference in its entirety.

TECHNICAL FIELD

The present invention relates to composite graphite particles for a nonaqueous secondary battery negative electrode, to an active material for a nonaqueous secondary battery negative electrode that uses those particles, and to a nonaqueous secondary battery provided with a negative electrode containing this negative electrode active material.

BACKGROUND ART

The demand for high-capacity secondary batteries is growing accompanying the reduced size of electronic devices. Nonaqueous secondary batteries, and particularly lithium ion secondary batteries, which demonstrate high energy density in comparison with nickel-cadmium batteries or nickel-hydrogen batteries, are attracting particular attention. Lithium ion secondary batteries, which are composed of positive and negative electrodes capable of occluding and releasing lithium ions and a nonaqueous electrolytic solution obtained by dissolving a lithium salt such as $LiPF_6$ or $LiBF_4$, have been deployed not only in conventional laptop personal computers, mobile communications devices, portable cameras and handheld game consoles, but also in power tools and electric automobiles, thus resulting in a growing need for higher capacities, faster charging and discharging characteristics and higher cycling characteristics in lithium ion secondary batteries accompanying their deployment in such applications.

Although various types of materials have been proposed for the negative electrode material of these batteries, natural graphite, artificial graphite obtained by graphitization of coke and the like, graphitized mesophase pitch and graphitic carbon materials such as graphitized carbon fiber are used at present due to their high capacity and the superior flatness of their discharge potential.

In recent years, studies have been conducted on the application of materials having high theoretical capacity, and particularly metal particle negative electrodes, with the aim of further increasing capacity.

For example, Patent Documents 1 and 2 propose methods for producing composite Si-graphite particles by firing a mixture of fine particles of an Si compound, graphite and a carbonaceous precursor in the form of pitch and the like.

Patent Document 3 proposes composite Si-graphite particles obtained by compounding Si fine particles with a carbonaceous material so that the Si fine particles are unevenly distributed on the surface of spherical natural graphite.

Patent Document 4 proposes composite graphite particles having as main components thereof metal capable of alloying with Li, flake graphite and a carbonaceous material, wherein the metal is held between a plurality of flake graphite layers, and specifically discloses composite Si-graphite particles.

Patent Document 5 proposes composite graphite particles composed of a granulated body obtained by crushing and granulating a mixture of a graphite raw material and metal powder in a high-speed airflow, wherein a portion of the graphite serving as raw material is crushed and the graphite raw material and its crushed product aggregate to form a laminated structure in which metal powder is present in a dispersed state internally and on the surface thereof, and specifically discloses composite Si-graphite particles.

Patent Document 6 discloses composite Si-graphite particles composed of roughly spherical particles having carbon microprotrusions on the surface thereof obtained by granulating and spheroidizing a mixture of void forming agents selected from vein and/or flake natural graphite, fine particles of an Si compound, carbon black, polyvinyl alcohol, polyethylene glycol, polycarbosilane, polyacrylic acid and cellulose-based polymers, and impregnating and coating the resulting spherical granulation product with a mixture of a carbon precursor and carbon black followed by firing.

Patent Document 7 discloses composite Si-graphite particles of a form in which Si particles are sandwiched between flake graphite, and are obtained by applying compressive force and shearing force to a mixture of Si particles, flake graphite and a solid non-graphitic carbon raw material at a temperature equal to or higher than the softening point of the non-graphitic carbon raw material to prepare intermediate composite particles followed by heat treatment.

Patent Document 8 discloses composite Si-graphite particles having a structure in which graphite is folded by mixing Si particles and flake graphite and subjecting to spheroidizing treatment.

PRIOR ART DOCUMENTS

Patent Documents

Patent Document 1: Japanese Unexamined Patent Publication No. 2003-223892
Patent Document 2: Japanese Unexamined Patent Publication No. 2012-043546
Patent Document 3: Japanese Unexamined Patent Publication No. 2012-124116
Patent Document 4: Japanese Unexamined Patent Publication No. 2005-243508
Patent Document 5: Japanese Unexamined Patent Publication No. 2008-027897
Patent Document 6: Japanese Unexamined Patent Publication No. 2008-186732
Patent Document 7: International Publication No. WO 2013/141104
Patent Document 8: International Publication No. WO 2014/046144

DISCLOSURE OF THE INVENTION

Problems to be Solved by the Invention

However, according to studies conducted by the inventors of the present invention, in the art described in Patent Document 1, since composite Si-graphite particles obtained by compounding graphite and Si compound particles with a carbonaceous material exhibit weak bindability of the carbonaceous material responsible for binding the composite Si-graphite particles, the composite Si-graphite particles collapse due to volume expansion of the Si compound particles accompanying charging and discharging, thereby preventing this art from reaching the level of practical application due to problems such as cycle deterioration attributable to interruptions in conductive paths and the like.

In the art described in Patent Document 2, although a structure is proposed (by defining the range of the Raman R value) in which the surfaces of Si compound particles and the surfaces of flake graphite particles are covered by amorphous carbon as a result of adequately stirring and mixing composite Si-graphite particles containing Si compound particles, flake graphite particles and a carbonaceous material derived from coal tar pitch prior to compounding (firing), since the bindability of compounding is weak in this case as well, the composite Si-graphite particles collapse due to volume expansion of the Si compound particles accompanying charging and discharging, thereby preventing this art from reaching the level of practical application due to problems such as cycle deterioration attributable to interruptions in conductive paths and the like.

In the art described in Patent Document 3, since Si compound particles localize on particle surfaces, the Si compound particles dissociate from the graphite surface due to volume expansion of the Si compound particles accompanying charging and discharging, thereby preventing this art from reaching the level of practical application due to problems such as cycle deterioration attributable to interruptions in conductive paths and the like.

In the art of Patent Documents 4 to 8, although it is possible to granulate flake graphite or arrange metal particles within particles during spheroidization, according to studies conducted by the inventors of the present invention, even if composite graphite particles are produced using the methods described in these patent documents, the metal particles present within the composite particles tend to aggregate, and were determined to not satisfy the battery properties targeted by the inventors of the present invention. Moreover, the efficiency at which metal particles are contained in the composite Si-graphite particles is low and leaves room for improvement.

With the foregoing in view, an object of the present invention is to provide composite graphite particles for a nonaqueous secondary battery negative electrode without allowing metal particles capable of alloying with Li to aggregate within the composite graphite particles, or in other words, allowing the metal particles to be present in a highly dispersed state. As a result thereof, a nonaqueous secondary battery is provided that has high capacity, high charge-discharge efficiency and superior discharge characteristics.

Means for Solving the Problems

As a result of conducting extensive studies to solve the aforementioned problems, the inventors of the present invention found that a nonaqueous secondary battery having high capacity, high charge-discharge efficiency and superior discharge characteristics can be obtained by applying to the negative electrode material of a nonaqueous secondary battery composite graphite particles for a nonaqueous secondary battery negative electrode (C) (to also be referred to as "composite graphite particles (C)") containing graphite (A) and metal particles capable of alloying with Li (B) (to also be referred to as "metal particles (B)"), the composite graphite particles (C) having a special characteristic to be subsequently described when observed with a scanning electron microscope (SEM).

When the composite graphite particles (C) of the present invention are observed by SEM, the degree of dispersion of the metal particles (B) in the composite graphite particles (C) as calculated according to the measurement method indicated below is 0.78 or more.

Although the detailed mechanism behind the usefulness of the aforementioned composite graphite particles (C) as a negative electrode material of a nonaqueous secondary battery is not understood, as a result of enclosing the metal particles (B) in the composite graphite particles (C), the possibility of the metal particles (B) making direct contact with the electrolytic solution decreases in comparison with a negative electrode material of the same capacity, namely containing the same amount of metal particles (B). Consequently, the irreversible loss of Li ions attributable to the reaction between the metal particles (B) and the nonaqueous electrolytic solution is reduced, or in other words, charge-discharge efficiency is improved.

In addition, since the composite graphite particles (C) of the present invention have the metal particles (B) dispersed within composite particles, even when compared with commonly known granulated composite graphite particles having the metal particles (B) enclosed therein or composite particles in which a larger amount of the metal particles (B) are added to the outside of graphite particles than to the inside of the particles, localized expansion and contraction (relaxation) are absorbed by the metal particles (B) present within the particles, thereby resulting in decreased likelihood of the occurrence of collapse of the composite graphite particles (C) caused by volume expansion and the subsequent interruption of conductive paths. As a result, high charge-discharge efficiency and superior discharge characteristics are thought to be demonstrated.

Namely, the gist of the present invention lies in <1> to <6> indicated below.

<1> Composite graphite particles for a nonaqueous secondary battery negative electrode comprising graphite and metal particles capable of alloying with Li, wherein the degree of dispersion of the metal particles in the composite graphite particles as calculated according to the measurement method indicated below is 0.78 or more.

(Measurement Method)

When a lattice is drawn in the form of a grid having a length of 2 μm per side (however, length per side A/10 μm in the case the length of the long axis <20 μm) for each of the images of the scanning electron microscope (SEM) of the cross-sections of 10 composite graphite particles satisfying the following condition:

$$|0.5 \times (A+B)-R| \leq 3$$

(wherein, A represents the length of the long axis (μm), B represents the length of the short axis (μm), and R represents the mean particle diameter d50 (μm)), the number of squares in the lattice that contain composite graphite particles are defined as x, and the number of squares in the lattice containing composite graphite particles that also contain metal particles are defined as y, then the values of y/x for any 5 particles are calculated, and the average value thereof is defined as the degree of dispersion.

<2> The composite graphite particles for a nonaqueous secondary battery negative electrode described in <1> above, wherein the tapped density of the composite graphite particles for a negative electrode is 0.8 g/cm$^3$ or more.

<3> The composite graphite particles for a nonaqueous secondary battery negative electrode described in <1> or <2> above, wherein the metal particles are contained at 1% by weight to 30% by weight.

<4> The composite graphite particles for a nonaqueous secondary battery negative electrode described in any one of <1> to <3> above, wherein the specific surface area as determined by the BET method is 0.1 $m^2/g$ to 20 $m^2/g$.

<5> An active material for a nonaqueous secondary battery negative electrode comprising the composite graphite particles for a nonaqueous secondary battery negative electrode described in any one of <1> to <4> above, and one or more types of materials selected from the group consisting of natural graphite, artificial graphite, carbonaceous material-coated graphite, resin-coated graphite and amorphous carbon.

<6> A nonaqueous secondary battery provided with a positive electrode and negative electrode, capable of occluding and releasing metal ions, and an electrolytic solution, wherein the negative electrode is provided with a current collector and a negative electrode active material formed on the current collector, and the negative electrode active material contains the active material for a nonaqueous secondary battery negative electrode described in any one of <1> to <5> above.

Effects of the Invention

As a result of using the composite graphite particles (C) for a nonaqueous secondary battery negative electrode according to the present invention as a negative electrode active material of a negative electrode for a nonaqueous secondary battery, a nonaqueous secondary battery can be provided that demonstrates high capacity, high charge-discharge efficiency and superior discharge characteristics.

BEST MODE FOR CARRYING OUT THE INVENTION

Figure 1:
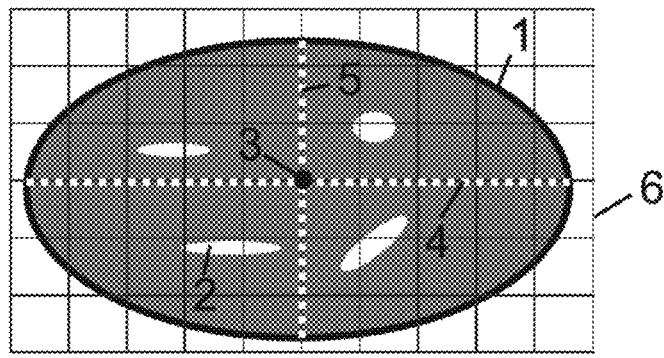
FIG. 1 is a schematic diagram of a cross-sectional image of composite graphite particles (C) indicating one example of a method for measuring the degree of dispersion of metal particles (B) in the composite graphite particles (C).

The following provides a detailed description of the contents of the present invention. Furthermore, explanations of constituents of the present invention described below are merely examples (representative examples) of embodiments of the present invention, and the present invention is not limited to these embodiments provided the gist thereof is not exceeded.

The composite graphite particles (C) for a nonaqueous secondary battery negative electrode of the present invention are composite graphite particles (C) for a nonaqueous secondary battery negative electrode that contain graphite (A) and metal particles (B) capable of alloying with Li, wherein the degree of dispersion of the metal particles (B) in the composite graphite particles (C) when viewing a cross-section of the composite graphite particles (C) with a scanning electron microscope as calculated according a specific measurement method to be subsequently described is 0.78 or more.

These composite graphite particles (C) are preferably produced by mixing at least the graphite (A) and the metal particles (B) capable of alloying with Li followed by spheroidizing treatment.

<Graphite (A)>

Although one example of the graphite (A), which is one constituent component of the composite graphite particles (C) of the present invention, is indicated below, there are no particular limitations on the graphite (A), conventionally known graphite and commercially available products may be used, and the graphite (A) may be fabricated by any production method.

(Types of Graphite (A))

The graphite (A) can be obtained by carrying out removal of impurities, crushing, screening and classification treatment as necessary on flake, bulk or plate natural graphite or flake, bulk or plate artificial graphite produced by heating, for example, petroleum coke, coal pitch coke, coal-based needle coke or mesophase pitch to 2500° C. or higher.

Among these, natural graphite is classified into flake graphite, crystalline (vein) graphite or amorphous graphite (refer to section on Graphite in "Compilation of Particulate Process Technologies", Industrial Technology Center, 1974) and "Handbook of Carbon, Graphite, Diamond and Fullerenes", Noyes Publications).

Since vein graphite has the highest degree of graphitization at 100 (% followed by flake graphite as 99.9%, these types of graphite are used preferably.

Natural graphite in the form of flake graphite is produced in countries such as Madagascar, China, Brazil, Ukraine and Canada, while vein graphite is mainly produced in Sri Lanka. The main production sites of amorphous graphite include the Korea peninsula, China and Mexico.

Among these types of natural graphite, since flake graphite and vein graphite offer the advantages of high degrees of graphitization and low levels of impurities, they can be used preferably in the present invention.

Examples of visual techniques for confirming that graphite is flake graphite include observing particle surfaces with a scanning electron microscope, and after having embedding particles in resin to prepare thin resin sections and then cutting out particle cross-sections, or after having prepared a coated film cross-section from a coated film composed of particles using a cross-section polisher and cutting out particle cross-sections, the particle cross-sections are observed with a scanning electron microscope.

Flake graphite and vein graphite consist of natural graphite, for which purity has been enhanced so as to demonstrate crystals having crystallinity completely similar to that of graphite, and artificially formed graphite, and is preferably natural graphite from the viewpoint of being industrially inexpensive.

(Physical Properties of Graphite (A))

Physical properties of the graphite (A) in the present invention are indicated below. Furthermore, although there are no particular limitations on measurement methods used in the present invention, they comply with the measurement methods described in the examples unless there are special circumstances.

(1) Volume Mean Particle Diameter (d50) of Graphite (A)

The volume mean particle diameter (d50) of the graphite (A) prior to compounding with the metal particles (B) (to also be referred to as "d50" in the present invention) is normally 1 μm to 50 μm, preferably 2 μm to 40 μm and more preferably 5 μm to 30 μm. If the volume mean particle diameter (d50) is within these ranges, composite graphite particles (C) can be produced that are embedded with the metal particles (B). In addition, if the volume mean particle diameter (d50) of the graphite (A) is excessively large, the particle diameter of the composite graphite particles (C) embedded with the metal particles (B) becomes large, thereby resulting in the formation of streaks and surface irregularities caused by large particles in a step for coating an electrode material mixed with the composite graphite particles (C) in the form of a slurry by adding a binder, water or organic solvent. If the volume mean particle diameter is excessively small, the specific surface area of the composite graphite particles (C) increases, resulting in the risk of an increase in side reactions with the electrolytic solution.

Here, volume mean particle diameter (d50) refers to the volume-based median diameter as measured by laser diffraction scattering particle size distribution measurement.

(2) Mean Aspect Ratio of Graphite (A)

Mean aspect ratio, which is the ratio of the length of the long axis to the length of the short axis of the graphite (A) prior to compounding with the metal particles (B), is normally 1 to 50, preferably 3 to 30 and more preferably 5 to 20. If mean aspect ratio is within these ranges, the metal particles (B) within the composite graphite particles (C) can be arranged with favorable dispersibility.

Furthermore, in the present invention, aspect ratio refers to the ratio of the length of the long axis to the length of the short axis of particles, and since the minimum value thereof is 1, the lower limit of aspect ratio is normally 1. Aspect ratio is measured by capturing electron micrographs of target particles, selecting 20 particles within a randomly selected region, defining the longest axis of each particle as a (μm) and the shortest axis as β (μm), determining the ratio α/β, and taking the mean value of a/f of the 20 particles to be the aspect ratio.

(3) Tapped Density of Graphite (A)

The tapped density of graphite (A) prior to compounding with the metal particles (B) is normally 0.1 $g/cm^3$ to 1.0 $g/cm^3$, preferably 0.13 $g/cm^3$ to 0.8 $g/cm^3$ and more preferably 0.15 $g/cm^3$ to 0.6 $g/cm^3$. If the tapped density of the graphite (A) is within the aforementioned ranges, the metal particles (B) can be dispersed at a high degree of dispersion in the composite graphite particles (C).

In the present invention, tapped density is defined as the density determined by dropping a raw material carbon material through a sieve having an opening size of 300 μm into a cylindrical tapping cell having a diameter of 1.6 cm and volume capacity of 20 $cm^3$ using a powder density tester and completely filling the cell, followed by tapping 1000 times at a stroke length of 10 mm and determining density from the volume and sample weight at that time.

(4) Specific Surface Area of Graphite (A) Determined According to BET Method Specific surface area of the graphite (A) prior to compounding with the metal particles (B) as determined according to the BET method is normally 1 $m^2/g$ to 40 $m^2/g$, preferably 2 $m^2/g$ to 35 $m^2/g$, and more preferably 3 $m^2/g$ to 30 $m^2/g$. Specific surface area of the graphite (A) according to the BET method is reflected in the specific surface area of the composite graphite particles (C). Consequently, by making the specific surface area of the graphite (A) to be 40 $m^2/g$ or less, decreases in battery capacity caused by irreversible increases in capacity when using the composite graphite particles (C) in an active material for a nonaqueous secondary battery negative electrode can be prevented.

In the present invention, specific surface area is measured according to the BET multipoint method using nitrogen gas adsorption.

(5) Interplanar Spacing of 002 Plane (d002) and Lc of Graphite (A)

Interplanar space of the 002 plane (d002) of the graphite (A) as determined by wide-angle X-ray diffraction is normally 0.337 nm or less. On the other hand, since the theoretical value of the interplanar spacing of the 002 plane of graphite is 0.335 nm, the interplanar spacing of the 002 plane of graphite is normally 0.335 nm or more.

In addition, crystallite size (Lc) of the graphite (A) in the direction of the c axis as determined by wide-angle X-ray diffraction is 90 nm or more and preferably 95 nm or more.

If the interplanar spacing of the 002 plane (d002) is 0.337 nm or less, the graphite (A) demonstrates high crystallinity, allowing the obtaining of high-capacity composite graphite particles (C). In addition, in the case Lc is 90 nm or more as well, the graphite (A) demonstrates high crystallinity, allowing the obtaining of a high-capacity negative electrode material that uses the composite graphite particles (C) containing the graphite (A).

(6) True Density of Graphite (A)

True density of the graphite (A) prior to compounding with the metal particles (B) is normally 2.1 $g/cm^3$ or more, preferably 2.15 $g/cm^3$ or more and more preferably 2.2 $g/cm^3$ or more. Graphite that demonstrates high crystallinity having a true density of 2.1 $g/cm^3$ or more allows the obtaining of high-capacity composite graphite particles (C) having low irreversible capacity.

(7) Lengths of Long and Short Axes of Particles of Graphite (A)

The length of the long axis of the graphite (A) prior to compounding with the metal particles (B) is preferably 40 μm or less, more preferably 35 μm or less and even more preferably 30 μm or less, and preferably 3 μm or more, more preferably 5 μm or more and even more preferably 8 μm or more.

In addition, the length of the short axis of the graphite (A) is normally 0.9 μm to 5 μm and preferably 1.5 μm to 4 μm. If the lengths of the long and short axes of the graphite (A) are within the aforementioned ranges, the degree of dispersion of the metal particles (B) in the composite graphite particles (C) improves.

(8) Oil Absorption of Graphite (A)

The amount of oil absorbed by the graphite (A) prior to compounding with the metal particles (B) when using dibutyl phthalate (DBP) is preferably 50 ml/100 g or more and more preferably 80 ml 100 g or more, and preferably 200 ml/100 g or less and more preferably 200 ml 100 g or less. Although there are no problems when oil absorption is excessively low, if oil absorption is excessively high, when the graphite (A) and metal particles (B) are mixed in a slurry and subjected to shearing force, a larger amount of solvent is required thereby resulting in the risk of poor productivity.

Furthermore, characteristics of the graphite (A) after having been compounded with the metal particles (B) are preferably within the range of the characteristics of the graphite (A) prior to compounding with the metal particles (B).

<Metal Particles (B) Capable of Alloying with Li>

In the composite graphite particles (C) of the present invention, the metal particles (B) capable of alloying with Li are mainly embedded within the composite graphite particles (C) although a portion thereof may be present on the surface of the composite graphite particles (C).

(Types of Metal Particles (B) Capable of Alloying with Li)

Although conventionally known metal particles can be used for the metal particles (B) capable of alloying with Li, a metal or compound thereof selected from the group consisting of Fe, Co, Sb, Bi, Pb, Ni, Ag, Si, Sn, Al, Zr, Cr, V, Mn, Nb, Mo, Cu, Zn, Ge, As, In, Ti and W is preferable from the viewpoints of capacity and cycle life. In addition, an alloy composed of two or more types of metals may be used, or the metal particles may be alloy particles formed from two or more types of metal elements. Among these, a metal or compound thereof selected from the group consisting of Si, Sn, As, Sb, Al, Zn and W is preferable.

In addition, although the metal particles (B) can be in the form of single crystals, polycrystals or in amorphous form regardless of the crystalline state thereof, they are preferably in the form of polycrystals from the viewpoints of facilitating reduced particle diameter and being able to anticipate higher capacity and high C-rate characteristics.

Examples of metal compounds include metal oxides, metal nitrides and metal carbides. In addition, metal compounds composed of two or more types of metals may also be used.

Si and/or Si compounds are preferable form the metal particles (B) from the viewpoint of high capacity. In the present description, Si and/or Si compounds are collectively referred to as Si compounds.

Specific examples of Si compounds include those represented by the general formulas Si, SiOx, SiNx and SiCx. In addition, Si compounds may be doped from a portion of the surface to the inside thereof by forming bonds between Si and elements such as C, N, P or F. Although the general formula SiOx is obtained by using raw materials consisting of silicon dioxide ($SiO_2$) and metal silicon (Si), the value of x is normally such that $0<x<2$, preferably 0.05 to 1.8, more preferably 0.1 to 1.6 and even more preferably 0.15 to 1.4. If the value of x is within these ranges, irreversible capacity caused by bonding between Li and oxygen can be reduced while simultaneously increasing capacity.

Bonding between the metal particles (B) and the aforementioned atoms can be analyzed by methods such as X-ray photoelectron spectroscopy (XPS), infrared spectroscopy (IR) or X-ray absorption fine structure analysis (XAFS).

The aforementioned sputtering treatment or a method consisting of mixing in a compound having the aforementioned atoms during mechanical energy treatment or high temperature treatment can be used to form bonds between the metal particles (B) and the aforementioned atoms. In addition, the metal particles (B) containing the aforementioned atoms can also be used as a raw material.

Impurities other than those previously described may be present within the Si compound or on the surface thereof.

(Physical Properties of Metal Particles (B) Capable of Alloying with Li)

Although there are no particular limitations on the metal particles (B) capable of alloying with Li in the present invention provided they are able to alloy with Li, the metal particles (B) preferably demonstrate the physical properties indicated below. Furthermore, although there are no particular limitations on the measurement methods used in the present invention, they comply with the measurement methods described in the examples unless there are special circumstances.

(1) Volume Mean Particle Diameter (d50) of Metal Particles (B)

The volume mean particle diameter (d50) of the metal particles (B) in the composite graphite particles (C) is normally 0.005 μm or more, preferably 0.01 μm or more, more preferably 0.02 μm or more and more preferably 0.03 μm or more, and normally 10 μm or less, preferably 9 μm or less and more preferably 8 μm or less. If the volume mean particle diameter (d50) is within these ranges, volume expansion accompanying charging and discharging is reduced and favorable cycling characteristics can be obtained while maintaining charge-discharge capacity.

Si and SiOx have a large theoretical capacity in comparison with graphite, and amorphous Si or nano-sized Si crystals facilitate the migration of alkaline ions such as lithium ions, thereby allowing the obtaining of high capacity. Polycrystalline Si is preferably used to obtain the aforementioned ranges from the viewpoints of facilitating reductions in particle diameter and demonstrating superior cycling characteristics and C-rate characteristics.

(2) Specific Surface Area of Metal Particles (B) Determined According to BET Method Specific surface area of metal particles (B) in the composite graphite particles (C) as determined according to the BET method is normally 0.5 $m^2/g$ to 120 $m^2/g$ and preferably 1 $m^2/g$ to 100) $m^2/g$. If specific surface area of the metal particles capable of alloying with Li as determined according to the BET method is within the aforementioned ranges, charge-discharge efficiency and discharge capacity of the resulting battery are high, migration of Li ions is rapid during high-speed charging and discharging, and rate characteristics are superior, thereby making this preferable.

(3) Oxygen Content of Metal Particles (B)

Although there are no particular limitations thereon, the oxygen content of the metal particles (B) in the composite graphite particles (C) is normally 0.01% by weight to 50% by weight and preferably 0.05% by weight to 30% by weight. Although the distribution of oxygen within the particles may be near the surface, within the particles or uniformly within the particles, it is preferably present near the surface in particular. If the oxygen content of the metal particles is within the aforementioned ranges, in addition to demonstrating superior initial efficiency, volume expansion accompanying charging and discharging is inhibited and cycling characteristics are superior due to the strong bonding between Si and O, thereby making this preferable.

(4) Purity of Metal Particles (B)

Although there are no particular limitations thereon, purity of the metal particles (B) in the composite graphite particles (C) is preferably 70% or more, more preferably 80% or more and even more preferably 90% or more. If purity is within the aforementioned ranges, capacity can be obtained that is close to the theoretical capacity of the metal particles (B). In addition, although there are no particular limitations on the composition of impurities present in the metal particles (B), the content of substances that cause side reactions in a nonaqueous secondary battery is preferably low.

(5) Crystallite Size of Metal Particles (B)

Although there are no particular limitations on crystallite size in the case the metal particles (B) within the composite graphite particles (C) are crystals, crystallite size of the (111) plane as calculated by X-ray diffraction (XRD) is normally 0.05 nm or more and preferably 1 nm or more, and normally 100 nm or less and preferably 50 nm or less. If the crystallite size of the metal particles is within the aforementioned ranges, the reaction between Si and Li ions proceeds rapidly, there is little susceptibility to the occurrence of dissociation of metal particles due to the formation of cracks since Li concentration in the metal particles is uniform, cycling characteristics are superior, and both input-output and rate characteristics are superior, thereby making this preferable.

Furthermore, characteristics of the metal particles (B) prior to compounding with the graphite (A) are preferably within the ranges of the characteristics of the metal particles (B) within the composite graphite particles (C) as described above.

(Production Method of Metal Particles (B) Capable of Alloying with Li)

(1) Previous Production Methods

The bottom-up approach is known to be one method for currently producing fine particles of the metal particles (B). This bottom-up approach consists of temporarily decomposing a material to the atomic or molecular level by reacting or evaporating followed by re-solidifying. Examples of vapor phase methods include plasma-enhanced vapor deposition that utilizes a chemical reaction (see, for example, Japanese Unexamined Patent Publication No. H6-279015) or arc melting consisting of physically evaporating a material (see, for example, Japanese Unexamined Patent Publication No. 2005-097654). Moreover, known examples of liquid phase methods include methods capable of defining a dispersed state in a liquid phase such as the co-precipitation method, reverse micelle method or hot soap method (see, for example, Japanese Unexamined Patent Publication No. 2003-515459). In addition, fine particles can also be synthesized using the top-down approach in which large particles are crushed into fine particles (see, for example. Japanese Unexamined Patent Publication No. H7-88391). An example of the aforementioned top-down approach is a method using a wet bead mill that carries out crushing using beads for the media (see, for example, Japanese Unexamined Patent Publication No. 2009-235263).

Although either the bottom-up approach or top-down approach can be used to produce the fine particles (B), producing the fine particles (B) using the top-down approach is preferable in the case of considering industrial productivity.

(2) Production Method of Metal Particles (B) Using Top-Down Approach

The metal particles (B) capable of alloying with Li are preferably used after selecting and combining crushers used according to the size of the raw materials and the target particle diameter. For example, a media mill (ball mill), vibration mill, pulverizer or jet mill and the like is used for the dry crusher if the target diameter is about 5 μm, and is preferably used together with coarse crusheres as necessary according to the raw material size. In the case the submicron range or smaller is the target particle diameter, a wet bead mill is preferable. Although examples of methods used by the crusher to separate the beads and media include gap separation, screen separation and centrifugal separation, any of these methods can be used provided they enable beads to be separated that are required for achieving the target particle diameter. In addition, since there are cases in which crushing is not completed by only passing particles through the crusher once, a system that allows circulation of solvent is preferable. Although there are no particular limitations thereon, examples include the Starmill LMZ Nanogetter HFM manufactured by Ashizawa Finetech Ltd., Pico Mill PCM manufactured by Asada Iron Works Co., Ltd., UVM Alpha Mill AM manufactured by Aimex Corp., and Ultra Apex Mill UAM manufactured by Kotobuki Kogyo Co., Ltd.

(3) Slurry Composition

Raw Material of Metal Particles (B) Capable of Alloying with Li

Commercially available metal particles may be used for the metal particles (B) provided they satisfy the characteristics of the present invention.

In addition, although there are no particular limitations on the production method, metal particles produced according to the method described in Japanese Patent No. 3952118, for example, can be used for the metal particles (B). In the case of producing SiOx, for example, after mixing silicon dioxide powder and silicon metal powder at a specific ratio and filling this mixture into a reactor, SiOx gas is generated by heating to 1000° C. or higher and holding at that temperature either at normal pressure or after reducing pressure to a specific pressure followed by cooling and precipitating the gas to obtain particles represented by the general formula SiOx (sputtering treatment). The precipitate can be used in the form of particles by applying mechanical energy treatment.

Although conventionally known raw materials can be used for the raw material of the metal particles (B), from the viewpoints of capacity and cycle life, a metal or compound thereof selected from the group consisting of Fe, Co, Sb, Bi, Pb, Ni, Ag, Si, Sn, Al, Zr, Cr, V, Mn, Nb, Mo, Cu, Zn, Ge, As, In, Ti and W is preferable. In addition, an alloy composed of two or more types of metals may be used, and the metal particles may be alloy particles formed from two or more types of metal elements. Among these, a metal or compound thereof selected from the group consisting of Si, Sn, As, Sb, Al, Zn and W is preferable. Furthermore, the raw material of the metal particles can be used in the form of single crystals, polycrystals or amorphous form regardless of the crystalline state thereof. Although there are no particular limitations thereon, in the case of an Si compound, for example, crushed ingots having purity of any of metal grade (3N), solar cell grade (6N) or semiconductor grade (9N) may be used, and either single crystal or polycrystalline ingots may be used (see, for example, Japanese Unexamined Patent Publication No. 2012-206923).

Dispersion Solvent

Although there are no particular limitations on the dispersion solvent used, that having favorable wettability with the raw material of the metal particles (B) is preferable from the viewpoint of improving dispersibility of the metal particles (B) in the composite graphite particles (C). In addition, a slurry used with a wet bead mill has favorable dispersibility, and that having low viscosity is preferable from the viewpoint of productivity. Moreover, a trace amount of a dispersant (surfactant) may be added to further increase wettability and dispersibility. A dispersant having no or extremely little reactivity with the metal particles (B) is preferably suitably selected for the dispersant.

The use of a nonpolar solvent or aprotic polar solvent is preferable for inhibiting reactions between solvent and newly-formed surfaces of the metal particles (B) following crushing, and that having an aromatic ring is particularly preferable. Although there are no particular limitations on the type of nonpolar compound having an aromatic ring, that which exhibits extremely little reactivity with the raw material of the metal particles (B) is more preferable. Examples thereof include liquid aromatic compounds such as benzene, toluene, xylene, cumene or methylnaphthalene, alicyclic hydrocarbons such as cyclohexane, methylcyclohexane, methylcyclohexene or bicyclohexyl, and residual oils of petrochemicals and coalchemicals in the manner of light oil or heavy oil. Among the aforementioned solvents, xylene is preferable from the viewpoint of crushing efficiency due to its low solvent viscosity and ease of drying.

In addition, solvents that dissolve not only water but also organic solvents are preferable for the aprotic polar solvent, examples of which include glycol-based solvents not having a hydroxyl group such as N-methyl-2-pyrrolidone (NMP), γ-butyrolactone (GBL), N,N-dimethylformamide (DMF) or propylene glycol monoethyl ether acetate (PGMEA). N,N-dimethylformamide (DMF) is preferable from the viewpoint of favorable dispersibility with Si compounds, its low boiling point and its low viscosity.

In the case of crushing with a protic polar solvent, it is preferably used by inhibiting decomposition gas.

The proportion of dispersion medium in the metal particles (B) and dispersion medium is normally 50% by weight or more and preferably 60% by weight or more and normally 90% by weight or less and preferably 80% by weight or less.

If the proportion of dispersion medium is excessively high, costs tend to increase when considering drying, and container size also becomes larger resulting in increased susceptibility to unevenness. Conversely, if the mixed proportion of the dispersion medium is excessively low, slurry viscosity increases due to a decrease in average distance between particles and slurry dispersibility tends to become poor.

Types of Dispersants

A dispersant may be added to the aforementioned dispersion medium when producing the metal particles (B). The dispersant is only required to be able to dissolve in each dispersion medium, and may be a low molecular weight surfactant that improves wettability. Examples thereof include Noigen TDS30, Noigen EN, Noigen ET65, Noigen ET115, Noigen ES-149D, DKS-NL-DASH400, DKS-NL-DASH408, Amiradine C1802, Dianol CDE, Plysurf A208B, Ply surf A208F, Catiogen ESL-9, Noigen TDS100, Noigen XL40, Noigen XL80, Noigen TDX50, Noigen LF60, Noigen EA87, Noigen EA167, Sorgen 30V, Noigen ET69, Noigen ETI49, Noigen ES99D, DKSNLIS, DKSNL50, Eban 410 (Dai-ichi Kogyo Seiyaku Co., Ltd.), Nopcosperse 092, SN Dispersant 9228, SN Sperse 70 (San Nopco Ltd.), PW36, DA375, KS806. KS873, 1831, 1850, DAI401, 1860 (Kusumoto Chemicals, Ltd.), Arquad 22-80, Armin 8D, Armin CD, Armin M20, Duomin CD, Duomin T, Esomin T/12, Erimin 0/12 and Armin OD. In addition, a high molecular weight dispersant is more preferable in which the target system is able to realize a dispersion system due to steric hindrance effects as particle diameter decreases. Examples thereof include Ajisper PA1 11, Ajisper PB821, Ajisper PB822, Ajisper PB881, Ajisper PN411 (Ajinomoto Co., Inc.), Anti-Terra U100, Byk-LPN6919, Disperbyk-102, Disperbyk-103, Disperbyk-111, Dispebyk-118, Disperbyk-167, Disperbyk-180. Disperbyk-2000, Disperbyk-2001, Disperbyk-2009, Dipserbyk-2013, Disperbyk-2022, Disperbyk-2050, Disperbyk-2152, Disperbyk-2155, Disperbyk-2164, Disperplast-1142, Disperplast-1148, Disperplast-1150 (Byk Chemie GmbH), Hinoact KF-100, Hinoact KF-1500, Hinoact T-6000, Hinoact T-8000. Hinoact T-8000E, Hinoact T-9100 (Kawaken Fine Chemicals Co., Ltd.), DA-703-50, DA375, DA1200, SPD200, SPD201, SPD201, DA325 and DN900 (Kusumoto Chemicals. Ltd.).

<Other Materials>

The composite graphite particles (C) for a nonaqueous secondary battery negative electrode of the present invention may contain materials other than the graphite (A) and the metal particles (B).

(Carbon Fine Particles)

The composite graphite particles (C) of the present invention may also contain carbon fine particles for improving electrical conductivity.

Volume Mean Particle Diameter (d50)

The volume mean particle diameter of the carbon fine particles is normally 0.01 μm to 10 μm, preferably 0.05 μm or more, more preferably 0.07 μm or more and even more preferably 0.1 μm or more, and preferably 8 μm or less, more preferably 5 μm or less and even more preferably 1 μm or less.

In the case the carbon fine particles have a secondary structure resulting from the congregation and aggregation of primary particles, although there are no particular limitations on the type or other properties thereof provided the primary particle diameter is 3 nm to 500 nm, the primary particle diameter is preferably 3 nm or more, more preferably 15 nm or more, even more preferably 30 nm or more and particularly preferably 40 nm or more, and preferably 500 nm or less, more preferably 200 nm or less, even more preferably 100 nm or less and particularly preferably 70 nm or less. The primary particle diameter of carbon fine particles can be measured by observing with an electron microscope such as an SEM or by measuring with a laser diffraction particle size distribution analyzer Types of Carbon Fine Particles There are no particular limitations on the shape of the carbon fine particles, and may have a granular shape, spherical shape, linear shape, needle shape, fibrous shape, plate-like shape or flake-like shape.

More specifically, although there are no particular limitations on the carbon fine particles, examples thereof includes substances having a nanostructure such as coal fine powder, vapor phase carbon powder, carbon black, Ketjen black, fullerene, carbon nanofibers, carbon nanotubes or carbon nanowalls. Carbon black is particularly preferable among them. The use of carbon black improves input-output characteristics at low temperatures while also simultaneously offering the advantages of being inexpensive and readily available.

(Carbon Precursor)

In addition, the composite graphite particles (C) of the present invention may also be mixed with a carbon precursor for inhibiting reactions between the metal particles (B) and nonaqueous electrolytic solution.

Reactions between the metal particles (B) and nonaqueous electrolytic solution can be inhibited as a result of the carbon precursor covering the periphery of the metal particles (B).

Mixing with the carbon precursor may be carried out prior to firing the composite particles or may be carried out by dissolving in a crushed slurry containing the metal particles (B) provided it is soluble therein Types of Carbon Precursors Carbon materials described in the following (α) and/or (β) are preferably used for the aforementioned carbon precursor.

(α) Carbonizable organic matter selected from the group consisting of coal-based heavy oil, direct flow heavy oil, cracked petroleum heavy oil, aromatic hydrocarbons, N ring compounds, S ring compounds, polyphenylene, synthetic organic polymers, natural polymers, thermoplastic resins and thermosetting resins (β) Product of dissolving carbonizable organic matter in low molecular weight organic solvents Coal tar pitch ranging from soft pitch to hard pitch or dry distillation liquefied oil is preferable for the aforementioned coal-based heavy oil. Atmospheric residue or vacuum residue is preferable for the aforementioned direct flow heavy oil. Ethylene tar produced as a by-product during cracking of crude oil, naphtha and the like is preferable for the aforementioned cracked petroleum heavy oil. Acenaphthylene, decacyclene, anthracene and phenanthrene are preferable for the aforementioned aromatic hydrocarbons. Phenazine and acridine are preferable for the aforementioned N ring compounds. Thiophene and bithiophene are preferable for the aforementioned S ring compounds. Biphenyl or terphenyl is preferable for the aforementioned polyphenylene. Polyvinyl chloride, polyvinyl alcohol, polyvinyl butyral, insoluble treatment products thereof, nitrogen-containing polymers such as polyacrylonitrile, polypyrrole, polyallylamine, polyvinylamine, polyethyleneimine, urethane resin and urea resin, polythiophene, polystyrene and polymethacrylic acid are preferable for the aforementioned synthetic organic polymers. Polysaccharides such as cellulose, lignin, mannan, polygalacturonic acid, chitosan or saccharose are preferable for the aforementioned natural polymers. Polyphenylene sulfide and polyphenylene oxide are preferable for the aforementioned thermoplastic resins. Furfuryl alcohol resins, phenol-formaldehyde resins and imide resins are preferable for the aforementioned thermosetting resins.

In addition, the carbonizable organic matter may also be a carbide of a solution obtained by dissolving in a low molecular weight organic solvent such as benzene, toluene, xylene, quinoline or n-hexane. One type of this carbonizable organic matter may be used alone or two or more types may be used in an arbitrary combination.

X-Ray Parameters of Carbon Materials Obtained by Firing Carbon Precursor

The d value of interplanar spacing of the (002) plane as determined by wide-angle X-ray diffraction of a powder of a carbon material obtained by firing the carbon precursor is normally 0.340 nm or more and preferably 0.342 nm or more. In addition, the d value is normally less than 0.380 nm, preferably 0.370 nm or less and more preferably 0.360 nm or less. An excessively large d002 value results in low crystallinity and cycling characteristics tend to decrease, while if the d002 value is excessively small, it is difficult to obtain the effect of compounding the carbon material.

In addition, the crystallite size (Lc(002)) of a carbon material as determined by X-ray diffraction according to the Gakushin method of a powder of a carbon material obtained by firing the carbon precursor is normally 5 nm or more, preferably 10 nm or more and more preferably 20 nm or more. In addition, crystallite size (Lc(200)) is normally 300 nm or less, preferably 200 nm or less and more preferably 100 nm or less. If crystallite size is excessively large, cycling characteristics tend to decrease, while if crystallite size is excessively small, charge-discharge reactivity decreases, resulting the risk of increases in generated gas during high-temperature storage and a decrease in large-current charge-discharge characteristics.

(Resin Serving as Void Forming Material)

In addition, the composite graphite particles (C) of the present invention may also be mixed with a resin serving as a void forming material in order to alleviate destruction of the composite graphite particles (C) caused by expansion and contraction of the metal particles (B). Furthermore, although the resin serving as a void forming material as referred to in the present description is included in some of the aforementioned carbon precursors, coal-based heavy oil, direct flow heavy oil and cracked petroleum heavy oil are not included.

Molecular Weight

Although there are no particular limitations thereon, the weight average molecular weight of the resin serving as a void forming material is normally 500 or more, preferably 1000 or more, more preferably 1500 or more, even more preferably 2000 or more and particularly preferably 2500 or more. On the other hand, the weight average molecular weight is normally 1,000,000 or less, preferably 500,000 or less, more preferably 300,000 or less, even more preferably 100,000 or less, particularly preferably 50,000 or less and most preferably 10,000 or less. In the case the molecular weight is excessively low, specific surface area increases resulting in a tendency for charge-discharge efficiency to decrease when contained in particles, while in the case the molecular weight is excessively high, viscosity increases, which tends to make uniform mixing and dispersion difficult.

Firing Yield

The firing yield of the resin serving as a void forming material is normally 0.1% or more, preferably 1% or more, more preferably 5% or more and even more preferably 10% or more, while normally less than 20%, preferably 18% or less, more preferably 16% or less and even more preferably 14% or less. In the case the firing yield is excessively high, voids are not formed and the alleviating action accompanying expansion and contraction of the metal particles (B) tends to decrease.

Decomposition Temperature

The decomposition temperature of the void forming material is normally 30° C. or higher, preferably 50° C. or higher, more preferably 100° C. or higher and even more preferably 150° C. or higher, while normally 500° C. or lower, preferably 400° C. or lower, more preferably 300° C. or lower and even more preferably 200° C. or lower. In the case the decomposition temperature is excessively low, there is the risk of the void forming material easily decomposing, while in the case the decomposition temperature is excessively high, it becomes difficult for the void forming material to dissolve in solvent, thereby resulting in the risk of making it difficult to disperse the void forming material uniformly.

Types of Resins

Although there are no particular limitations thereon, examples of resins that can be used for the void forming material include polyvinyl alcohol, polyethylene glycol, polycarbosilane, polyacrylic acid and cellulose-based polymers, and polyvinyl alcohol and polyethylene glycol can be used particularly preferably from the viewpoint of low remaining carbon on firing and having a comparatively low decomposition temperature.

(Other Resins)

In addition, the metal particles (B) may also contain a resin so as to cover the surface of the metal particles (B). Silane coupling agent-derived resins that are able to bind to silanol groups (see, for example, Japanese Unexamined Patent Publication No. 2006-196338) and resins having functional groups demonstrating high affinity for the metal particles (B) are preferable.

<Composite Graphite Particles (C) for Nonaqueous Secondary Battery Negative Electrode>

The composite graphite particles (C) of the present invention contain graphite (A) and metal particles (B) capable of alloying with Li, and when cross-sections of the composite graphite particles (C) are observed with a scanning electron microscope (SEM), the degree of dispersion of the aforementioned metal particles (B) in the composite graphite particles (C) as calculated according to the measurement method to be subsequently described is 0.78 or more.

Degree of Dispersion of Metal Particles (B) within Composite Graphite Particles (C)

The degree of dispersion of the metal particles (B) in the composite graphite particles (C) as measured according to the method used to measure the composite graphite particles (C) of the present invention indicated below is 0.78 or more, preferably 0.8 or more, more preferably 0.85 or more, even more preferably 0.87 or more, particularly preferably 0.89 or more and most preferably 0.92 or more. In addition, the maximum degree of dispersion is 1. A higher value within the aforementioned ranges indicates that the metal particles (B) are uniformly dispersed in the composite graphite particles (C), and when used to form a negative electrode, particle destruction caused by local expansion within the particles can be prevented, reductions in charge-discharge efficiency in each cycle can be inhibited, and rate characteristics tend to be superior.

The degree of dispersion of the metal particles (B) in the composite graphite particles (C) of the present invention is calculated in the manner indicated below. It is necessary to observed particle cross-sections of the composite graphite particles (C) in order to calculate degree of dispersion. Although there are no particular limitations on the method used to observe particle cross-sections, particle cross-sections can be observed by an observation method consisting of preparing a polar plate of the composite graphite particles (C), a coated film of the composite graphite particles (C), or resin thin sections by embedding the composite graphite particles (C) in resin and the like, followed by cutting the prepared specimens with a focused ion beam (FIB) or by ion milling, cutting out particle cross-sections and then observing the particle cross-sections with a scanning electron microscope (SEM).

The accelerating voltage when observing cross-sections of primary particles of the composite graphite particles (C) with a scanning electron microscope (SEM) is normally preferably 1 kV or more, more preferably 2 kV or more and even more preferably 3 kV or more, and normally 10 kV or less, more preferably 8 kV or less and even more preferably 5 kV or less. If accelerating voltage is within these ranges, it becomes easy to distinguish between graphite particles and Si compounds due to differences in reflected secondary electron images present in the resulting SEM images. In addition, the imaging magnification factor is normally 500× or more, more preferably 1000× or more and even more preferably 2000× or more, and normally 10000× or less. If the magnification factor is within the aforementioned ranges, it becomes possible to acquire an image of an entire primary particle of the composite graphite particles (C). Resolution is 200 dpi (ppi) or more and preferably 256 dpi (ppi) or more. In addition, the images are preferably evaluated at 800 pixels or more. Although elements of the graphite (A) and metal particles (B) may be identified by energy-dispersive X-ray spectroscopy (EDX) and wavelength-dispersive X-ray spectroscopy (WDX) while observing images, since, for example, the electron conductivity of Si compounds is normally not favorable, they tend to appear white particularly in the case of reflected electron images. Consequently, they can be easily distinguished from graphite (A) and amorphous carbon. In the case graphite (A) and metal particles (B) are easily distinguished, particles having a white reflection in reflected electron images and the like are defined as metal particles (B).

Furthermore, since there is the risk of the boundaries between metal particles (B) and graphite (A) becoming ambiguous in cases of low resolution during EDX (EDS) or WDX, mapping is preferably carried out at a high resolution roughly equal to that during SEM when carrying out analyses by mapping images.

Degree of Dispersion Measurement Method and Conditions

The method used to measure degree of dispersion is defined as satisfying conditions 1 to 4 indicated below.

(Condition 1)

100 or more composite graphite particles (C) are randomly selected in an acquired image (and preferably, a polar plate). At this time, the particles are demarcated in contour units of the composite graphite particles (C). Although there are no particular limitations on the method used to demarcate the particles, any image processing software may be used provided background and the distinction between light and dark are well-defined, although the boundaries may be defined manually in cases in which distinction is difficult. Although the particles may be approximated with polygons, they are preferably minimally approximated with hectogons or better to prevent the particles from becoming coarse. The center of gravity (centroid) is then defined with a single, arbitrary extracted composite graphite particle (C). First, the particle demarcated from this boundary is approximated with squares. Although the size of the squares is not particularly specified, it preferably corresponds to an actual dimension of 5 nm or less. Two-dimensional coordinates are then determined on the image. The coordinates at the center of the squares is defined. The squares are then numbered from 1 to N assuming the squares to have the same weight. The coordinates of the center of gravity of the composite particle are then determined from the following equation 1.

[Equation 1]

$$\vec{r}_G = \frac{\sum_1^N \vec{r}_i}{N} \quad (1)$$

Here, $r_i$ represents the coordinates of the ith square and $r_G$ represents the coordinates of the center of gravity. The procedure for determining the center of gravity may be carried out with any imaging software, and the demarcated grid may be determined with the following equation provided each center of gravity can be defined with an arbitrary figure.

[Equation 2]

$$\vec{r}_G = \frac{\sum_1^N A_i \vec{r}_i}{\sum_1^N A_i} \quad (2)$$

Here, $A_i$ represents the area of the ith figure and $r_i$ represents the coordinates of the center of gravity (centroid) of the ith figure.

Next, the longest line segment among the arbitrary line segments demarcated by the aforementioned established boundary according to the determined center of gravity is defined as the long axis. In addition, the line segment that is perpendicular to the long axis among the arbitrary line segments demarcated by the aforementioned established boundary according to the center of gravity is defined as the short axis.

(Condition 2)

The 100 or more composite graphite particles (C) randomly selected according to Condition 1 are subjected to processing in the manner described above to determine the center of gravity, long axis and short axis, and 10 particles that satisfy the following condition are randomly selected.

$$|0.5 \times (A+B) - R| \leq 3$$

Here, A represents the length of the long axis (μm), B represents the length of the short axis (μm), and R represents the mean particle diameter d50 (μm).

(Condition 3)

A grid-like lattice is drawn for the 10 composite graphite particles (C) selected according to Condition 2. The lattice is placed so as to be parallel with the long axis of the particles (C) and so that one intersection of the lattice aligns with the center of gravity. The squares of the lattice are in the shape of squares, those for which the length of the long axis A of the particles (C) is longer than 20 μm (namely, in the case A >20 μm) have a length on one side of 2 μm, and those that are smaller than this (namely, in the case A<20 μm) have a length on one side equal to one-tenth the length of the long axis A (namely, A/10 μm). Among the lattice squares, the number of squares in the lattice that contain a composite graphite particle (C) is designated as x. The area of the composite particle (C) relative to the area of the square is 50% or less are defined as squares in the lattice that do not contain the composite graphite particle (C). The number of squares in the lattice that contain a composite graphite particle (C) and also contain a metal particle (B) is designated as y. The values of y/x of five random particles among the 10 particles selected according to Condition 2 for which the lattice is drawn are respectively calculated, and the average value thereof is defined as the degree of dispersion (see FIG. 1).

(Condition 4)

Furthermore, particles not composed of graphite (A) and/or metal particles (B) are excluded from the target particles. Moreover, composite graphite particles (C) that are obviously fragmented or tom are also excluded since they are not suitable as evaluation targets of the composite graphite particles (C). In addition, in order to avoid selecting peculiar particles, degree of dispersion is judged to be unmeasurable in the case less than 5 of the 100 composite graphite particles (C) contained in the image satisfy the aforementioned extraction conditions.

(Preferable Conditions)

More preferable conditions for selecting the particles extracted according to Condition 3 preferably consist of selecting those particles in which the relationship between the long axis A and short axis B satisfies the equation indicated below.

$$|(A/B \text{ of particles extracted according to Condition 3})/(\text{average value of } (A/B) \text{ of all particles extracted according to Condition 1}) - 1| \leq 0.5$$

In addition, although there are no particular limitations on the range over which the particles extracted according to Condition 1 are selected, they are preferably extracted from a range of a plurality of images measuring 100 μm×150 μm and more preferably from one or more images, while preferably extracted from a range of 10 images or less. In the case of being unable to extract 100 or more particles within the aforementioned ranges, particles are preferably selected by making contrivances to the method used to prepare the polar plate.

Although target composite graphite particles (C) that satisfy these Conditions 1 to 4 and satisfy the degree of dispersion of the present invention are only normally required to be present at 5% or more as the number of particles in a cross-section over a range of 200 μm×200 μm cross-section of a negative electrode, the number of particles is normally 30%, more preferably 50%, even more preferably 90% or more and particularly preferably 99% or more based on the total number of target composite graphite particles (C).

(Physical Properties of Composite Graphite Particles (C))

Although there are no particular limitations on the composite graphite particles (C) provided the degree of dispersion of the metal particles (B) in the composite graphite particles (C) is 0.78 or more as calculated according to the aforementioned measurement method when observing cross-sections of the composite graphite particles with a scanning electron microscope (SEM), the composite graphite particles (C) preferably have the properties indicated below.

(1) Tapped Density of Composite Graphite Particles (C)

The tapped density of the composite graphite particles (C) of the present invention is normally 0.8 g/cm$^3$ or more, preferably 0.85 g/cm$^3$ or more, more preferably 0.88 g/cm$^3$ or more, and even more preferably 0.9 g/cm$^3$ or more. On the other hand, the tapped density is normally 1.5 g/cm$^3$ or less, preferably 1.4 g/cm$^3$ or less and more preferably 1.35 g/cm$^3$ or less.

The demonstrating of a large value for tapped density by the composite graphite particles (C) of the present invention is an indicator that the composite graphite particles (C) exhibit a spherical shape. A smaller tapped density is an indicator that the composite graphite particles (C) do not have a sufficiently spherical shape. If tapped density is excessively low, adequate continuous voids are unable to be secured in the electrode and mobility of Li ions with electrolytic solution retained in the voids decreases, thereby resulting in the risk of a decrease in rapid charge-discharge characteristics.

Furthermore, in the case the metal particles (B) are aggregated, compounding with the graphite (A) occurs non-uniformly starting at the aggregated particles, and as a result thereof, there is the possibility of a decrease in particle fillabiity, or in other words, a decrease in tapped density. However, since the metal particles (B) are uniformly dispersed in the composite graphite particles (C) of the present invention and maintain favorable binding with graphite, they are thought to be particles having high tapped density.

(2) Interplanar Spacing d Value of (002) Plane of Composite Graphite Particles (C)

The interplanar spacing value d of the (002) plane of the composite graphite particles (C) of the present invention as determined by wide-angle X-ray diffraction is normally 0.337 nm or less, while on the other hand, since the theoretical value of the interplanar spacing value d of the 002 plane of graphite is 0.335, the interplanar spacing value d of the 002 plane of graphite is normally 0.335 nm or more. In addition, the Lc value of the graphite (A) as determined by wide-angle X-ray diffraction is 90 nm or more and preferably 95 nm or more. The interplanar spacing d value of the (002) plane and Lc value of the as determined by wide-angle X-ray diffraction being within the aforementioned ranges indicates that the composite graphite particles (C) can serve as a material of a high-capacity electrode.

(3) Volume Mean Particle Diameter (d50) of Composite Graphite Particles (C)

The volume mean particle diameter (d50) of the composite graphite particles (C) of the present invention is preferably 40 μm or less and more preferably 30 μm or less, and normally 1 μm or more, preferably 4 μm or more and more preferably 6 μm or more. If the volume mean particle diameter d50 is excessively large, problems such as streaking occur during coating, while if the volume mean particle diameter d50 is excessively small, a larger amount of binder is required, resistance increases and high current density charge-discharge characteristics tend to decrease.

(4) Raman R Value of Composite Graphite Particles (C)

The ratio of peak intensity in the vicinity of 1360 cm$^{-1}$ to the peak intensity in the vicinity of 1580 cm$^{-1}$ in an argon ion laser Raman spectrum of the composite graphite particles (C) of the present invention in the form of the Raman R value is normally 0.05 to 0.4 and preferably 0. If to 0.35. If the Raman R value is within these ranges, crystallinity of the surface of the composite graphite particles (C) is orderly and high capacity can be expected.

(5) Specific Surface Area of Composite Graphite Particles (C) Determined According to BET Method Specific surface area of the composite graphite particles (C) of the present invention as determined according to the BET method is normally 20 m$^2$/g or less, preferably 15 m$^2$/g or less, more preferably 10 m$^2$/g or less, even more preferably 8.5 m$^2$/g or less and still more preferably 8 m$^2$/g or less, and normally 0.1 m$^2$/g or more, preferably 1 m$^2$/g or more, more preferably 3 m$^2$/g or more, even more preferably 5 m$^2$/g or more and particularly preferably 6.5 m$^2$/g or more. If the specific surface area is excessively large, since those locations where the composite graphite particles (C) contact the nonaqueous electrolytic solution increase when using as an active material for a negative electrode, reactivity increases, the amount of gas generated becomes excessively large, and it tends to be difficult to obtain a preferable battery. If specific surface area is excessively small, the acceptability of lithium ions during charging tends to become poor in the case of using as an active material for a negative electrode.

(6) Content of Metal Particles (B) in Composite Graphite Particles (C)

The content of the metal particles (B) in the composite graphite particles (C) of the present invention based on the composite graphite particles (C) is normally 0.5% by weight or more, preferably 1% by weight or more, more preferably 1.5% by weight or more and even more preferably 2% by weight or more. In addition, the content of the metal particles (B) is normally 99% by weight or less, preferably 70% by weight or less, more preferably 50% by weight or less, even more preferably 30% by weight or less and particularly preferably 25% by weight or less. If the content of the metal particles (B) is within these ranges, it becomes possible to obtain adequate capacity, thereby making this preferable. Furthermore, measurement of the content of the metal particles (B) in the composite graphite particles (C) is carried out using the method to be subsequently described.

(7) Internal Void Fraction of Composite Graphite Particles (C)

The internal void fraction of the composite graphite particles (C) of the present invention based on the graphite (A) of the composite graphite particles (C) is normally 1% or more, preferably 3% or more, more preferably 5% or more and even more preferably 7% or more. In addition, the internal void fraction is normally less than 50%, preferably 40% or less, more preferably 30% or less and even more preferably 20% or less. If the internal void fraction is excessively low, the composite graphite particles (C) tend to be destroyed when the metal particles (B) expand. In addition, these voids may be filled with a substance such as amorphous carbon, graphite material or resin so as to alleviate expansion and contraction of the metal particles (B) capable of alloying with Li. When confirming void fraction by SEM using cross-sections of the composite graphite particles (C), void fraction can be calculated using the following equation (2) on 20 random particles.

Equation (2)

$$\text{Area of voids within composite graphite particles } (C)/\text{area of voids of graphite } (A)+\text{metal particles } (B)+\text{composite graphite particles } (C) \qquad (2)$$

<Production Method of Composite Graphite Particles (C) for Nonaqueous Secondary Battery Negative Electrode>

Although there are no particular limitations on the method used to produce the composite graphite particles (C) for a nonaqueous secondary battery negative electrode in the present invention provided the method allows the obtaining of composite graphite particles (C) having the aforementioned properties, an example thereof consists of stirring the graphite (A), having a comparatively small particle diameter such that the value of d50 is 20 μm or less, and the metal particles (B) after adjusting the concentration such that suitable shearing stress is applied in the slurry to prepare a slurry containing an aggregate of the graphite (A) and the metal particles (B), and drying this aggregate slurry so that 5% or more of solvent remains therein, followed by carrying out spheroidizing treatment with the solvent residue still contained in the slurry to efficiently embed the metal particles (B) in the composite graphite particles (C) in a highly dispersed state. Here, components other than the graphite (A) and the metal particles (B) may also be mixed in simultaneously.

More specifically, the production method preferably comprises the following step 1, step 2 and step 3.

Step 1: Step for obtaining a mixture at least containing graphite (A) and metal particles (B).

Step 2: Step for obtaining an aggregate of the graphite (A) and the metal particles (B).

Step 3: Step for applying mechanical energy to the aggregate of step 2 and subjecting to spheroidizing treatment.

The following provides a detailed explanation of the production method of the present invention.

(Step 1: Step for Obtaining Mixture Containing at Least Graphite (A) and Metal Particles (B))

Although examples of the state of the mixture obtained in this step include that in the form of granules, a solid, a block or a slurry, the mixture is preferably in the form of a block from the viewpoint of ease of handling.

The mixing ratio of the metal particles (B) to the total amount of the graphite (A) and the metal particles (B) is normally 1% by weight or more, preferably 3% by weight or more, more preferably 5% by weight or more and even more preferably 7% by weight or more. In addition, the mixing ratio is normally 95% by weight or less, preferably 90% by weight or less, more preferably 80% by weight or less and even more preferably 70% by weight or less. If the mixing ratio is within these ranges, adequate capacity can be obtained, thereby making this preferable. The graphite (A) used in this step is normally 1 μm to 50 μm, preferably 2 μm to 40 μm and more preferably 5 μm to 30 μm. If within these ranges, composite graphite particles (C) can be produced that are embedded with the metal particles (B), and composite particles can be obtained in which the metal particles (B) are highly dispersed therein.

In addition, in the present step, carbon fine particles may also be mixed in to improve electrical conductivity of the composite graphite particles (C), a carbon precursor may be mixed in to inhibit a reaction between the metal particles (B) and the nonaqueous electrolytic solution, or a void forming material in the form of a resin and the like may be mixed in to alleviate destruction of composite graphite particles caused by expansion and contraction of the metal particles (B).

In the case of mixing in other materials other than the graphite (A) and metal particles (B), the mixing ratio of other materials to the total amount of the graphite (A), the metal particles (B) and the other materials is normally 0.1% by weight or more, preferably 0.3% by weight or more, more preferably 0.5% by weight or more and even more preferably 0.7% by weight or more. In addition, the mixing ratio is normally 30% by weight or less, preferably 28% by weight or less, more preferably 26% by weight or less and even more preferably 25% by weight or less. If the mixing ratio is within these ranges, adequate capacity can be obtained, thereby making this preferable.

In the present step, there are no particular limitations on the method used to mix the graphite (A), the metal particles (B) and the other materials provided a mixture is obtained that at least contains the graphite (A) and the metal particles (B) capable of alloying with Li.

The mixing method may consist of simultaneously adding the graphite (A), the metal particles (B) capable of alloying with Li and the other materials followed by mixing, or sequentially adding each of these components separately followed by mixing.

An example of a preferable method for obtaining the mixture consists of using wet metal particles (B) and mixing with the graphite (A) so as not to allow the metal particles (B) to dry.

Metal particles (B) obtained directly by producing the metal particles (B) using a wet method, metal particles (B) produced using a dry method may be dispersed in a dispersion medium prior to mixing with the graphite (A), or metal particles (B) mixed with other materials dissolved in a solvent and the like to wet the metal particles (B) may be used for the wet metal particles (B).

The metal particles (B) that have been wetted in this manner can be uniformly dispersed during mixing since aggregation of the metal particles (B) is inhibited, and metal particles (B) are easily immobilized on the surface of the graphite (A), thereby making this preferable.

In the present description, in the case of mixing the metal particles (B) in the form of a slurry when mixing the metal particles (B) into the graphite (A), the solid content of the metal particles (B) in the slurry is normally 10% by weight or more, preferably 15% by weight or more and more preferably 20% by weight or more, and normally 90% by weight or less, preferably 85% by weight or less and more preferably 80% by weight or less. If the proportion of this solid content is excessively high, the slurry loses fluidity and the metal particles (B) tend to be difficult to disperse in the graphite (A), while if the proportion of the solid content is excessively low, handling tends to become difficult in this step.

In addition, after mixing the graphite (A) and the metal particles (B), the mixture is stirred so as to suitably apply shearing stress to the slurry, and from the viewpoint of facilitating the formation of an aggregate, removing solvent from the mixed slurry or adding the dispersion medium used when wet-crushing the metal particles (B) during mixing makes it possible to control the solid content.

The non-volatile (NV) ratio at the time of mixing the graphite (A) and the metal particles (B) when applying shearing stress is preferably 30% or more and more preferably 40% or more. In addition, the non-volatile (NV) ratio is preferably 70% or less and more preferably 60% or less.

In a slurry having an NV ratio within the aforementioned ranges, the slurry is preferably in a state in which it does not flow when leveled, and if the NV ratio is excessively high, excessive shearing stress ends up being applied to the graphite (A), which tends to destroy the graphite (A) or prevent the formation of aggregates of the graphite (A) and the metal particles (B). In addition, if the NV ratio is excessively low, the metal particles (B) undergo migration when removing the solvent, which tends to lower the degree of dispersion of the composite graphite particles (C).

(Step 2: Step for Obtaining Aggregates of Graphite (A) and Metal Particles (B))

In the present invention following step 1, aggregates of the graphite (A) and the metal particles (B) are preferably formed by evaporating off and drying the dispersion medium using an evaporator, a dryer and the like.

Alternatively, aggregates of the graphite (A) and metal particles (B) are preferably formed as a result of suitably applying shearing stress to the slurry by mixing while evaporating the dispersion medium and heating in a high-speed stirrer directly without adding a surplus of dispersion medium. Furthermore, the aggregates are preferably put into a wet state after drying. The content of solvent residue in aggregates of the graphite (A) and metal particles (B) based on the total weight of the graphite (A) and metal particles (B) is normally 1% by weight or more, preferably 2% by weight or more and more preferably 3% by weight or more. In addition, the content of solvent residue is normally 40% by weight or less, preferably 30% by weight or less and more preferably 20% by weight or less. If within these ranges, composite particles can be obtained in which the Si compound is highly dispersed. In addition, the amount of solvent residue may be adjusted to a suitable amount by suitably adding dispersion medium after drying.

Furthermore, there are no particular limitations on the time at which the other materials are mixed in order to obtain the mixture and aggregates, and for example, other materials may be added when mixing the graphite (A) and metal particles (B), the other materials may be added to wet metal particles (B) or a slurry of metal particles (B), or the other materials may be added when wet-crushing the metal particles (B). Although the state when mixing the other materials may be a powder or a solution obtained by dissolving in a solvent, a solution is preferable from the viewpoint of allowing the other materials to be uniformly dispersed.

Among these other materials, the carbon precursor and resin serving as a void forming material not only fulfill the role of immobilizing the metal particles (B) on the graphite (A), but are also thought to fulfill the role of preventing dissociation of the metal particles (B) from the graphite (A) during the spheroidization step. As a result, destruction of the composite graphite particles (C) can be inhibited.

Among the mixtures previously described, a more preferable mixture is obtained by mixing the graphite (A), the metal particles (B) and a resin, and from the viewpoint of being able to uniformly disperse the graphite (A), the metal particles (B) and the resin for inhibiting dissociation of the metal particles (B) in the mixture, mixing a slurry of the metal particles (B) with a resin for inhibiting dissociation of the metal particles (B) dissolved in a solvent followed by mixing the graphite (A) therein is more preferable for the combination of steps for obtaining this mixture. In addition, at this time, another material in the form of a carbon precursor may be further mixed in from the viewpoint of being able to inhibit reactivity between the metal particles (B) and the electrolytic solution, or a void forming material in the form of a resin may be mixed in to alleviate destruction of the composite graphite particles (C) caused by expansion and contraction of the metal particles (B).

Although mixing is normally carried out at normal pressure, it can also be carried out under reduced pressure or added pressure as desired. Mixing can also be carried out by a batch process or a continuous process. In either case, mixing efficiency can be improved by combining the use of a device suitable for coarse mixing and a device suitable for fine mixing. In addition, a device may also be used that carries out mixing and immobilization (drying) simultaneously. Although drying can normally be carried out under reduced pressure or added pressure, drying is preferably carried out under reduced pressure.

Drying time is normally 5 minutes or more, preferably 10 minutes or more, more preferably 20 minutes or more and even more preferably 30 minutes or more, and normally 2 hours or less, preferably 1.5 hours or less and even more preferably 1 hour or less. If drying time is excessively long, it leads to increased costs, while if drying time is excessively short, uniform drying tends to become difficult.

Although varying according to the solvent, drying temperature is preferably the amount of time that enables drying to be realized in the times indicated above.

In addition, the drying temperature is also preferably equal to or lower than the temperature at which the resin serving as another material does not undergo degeneration.

Examples of devices used for a batch type of mixing device include mixers employing a structure in which two frames rotate while revolving, devices employing a structure in which a single blade carries out stirring and dispersing in a tank in the manner of a high-speed, high-shear mixer in the form of a dissolver or high-viscosity butterfly mixer, so-called kneader-type devices that have a structure in which a sigma-type or other stirring blade rotates along the lateral surface of a semi-cylindrical mixing tank, a type of device using biaxial or triaxial stirring blades, and a so-called bead mill type of device having a rotating disk and a dispersion medium in a container.

In addition, a device employing a structure having a container in which paddles rotated by a shaft are housed therein, in which the sides of the container substantially follow the outermost line of the paddle rotation, and are preferably formed into a long catamaran shape, and a large number of pairs of paddles are arranged in the axial direction of the shaft so as to as to bite into mutually opposing sides while able to slide over the sides (such as the KRC Reactor or SC Processor manufactured by Kurimoto, Ltd., the Model TEM manufactured by Toshiba Machine Selmac Co., Ltd., or the Model TEX-K manufactured by Japan Steel Works Ltd.), or an (exothermic) device employing a structure having a single internal shaft and a container having a plurality of spade-shaped or serrated paddles attached to the shaft arranged while changing the phase thereof, in which the inside walls thereof substantially follow the outermost line of the paddle rotation, and are preferably formed into a cylindrical shape (such as the Lodige Mixer manufactured by Lodige GmbH, the Flow Share Mixer manufactured by Pacific Machinery & Engineering Co., Ltd., or the DT Dryer manufactured by Tsukishima Kikai Co., Ltd.). A pipeline mixer, continuous bead mill and the like may be used when carrying out mixing with a continuous process. In addition, a uniform mixture can also be obtained with a means such as ultrasonic dispersion. Among the aforementioned mixing devices, a device of a type employing biaxial or triaxial stirring blades is used preferably from the viewpoint of ease of adjusting shearing stress during mixing. In addition, a powder step consisting of crushing, shredding or classification may also be applied to the mixture obtained in this step.

Although there are no particular limitations on the device used for crushing and shredding, examples of coarse crushers include shearing mills, jaw crushers, impact crushers and cone crushers, examples of intermediate crushers include roll crushers and hammer mills, and examples of fine crushers include ball mills, vibration mills, pin mills, mixing mills and jet mills.

Although there are no particular limitations on the device used for classification treatment, in the case of, for example, dry screening, a rotary sieve, shaking sieve, gyrating sieve or vibrating sieve can be used, in the case of dry air classification, a gravity classifier, inertial classifier or centrifugal classifier (such as a classifier or cyclone) can be used, or a wet sieve, mechanical wet classifier, hydraulic classifier, settling classifier or centrifugal wet classifier and the like can be used.

(Step 3: Step for Carrying Out Spheroidizing Treatment by Applying Mechanical Energy to Aggregate of Step 2)

As a result of going through step 3, aggregates containing the graphite (A) and the metal particles (B) can be further compounded, resulting in the attainment of high tapped density and a high degree of dispersion, thereby making this preferable.

In other words, although an example of a production method for obtaining the composite graphite particles (C) of the present invention consists of carrying out spheroidizing treatment on aggregates containing the metal particles (B) on the surface of the graphite (A) obtained in the aforementioned step 2 (to also be simply referred to as aggregates in the present description), in the present invention in particular, production conditions as subsequently described are preferably suitably set so that the metal particles (B) are made to be present in voids of the graphite (A) within a prescribed range. As a result of carrying out spheroidizing treatment in a state of containing solvent residue, adhesion between the graphite (A) and metal particles (B) in the aggregates increases, and since the metal particles (B) can be inhibited from separating from the aggregates and aggregating, composite graphite particles (C) tend to be obtained that have a high degree of dispersion.

Furthermore, spheroidizing treatment specifically refers to treatment that utilizes mechanical energy (mechanical action such as impact compression, friction or shearing force). More specifically, treatment using a hybridization system is preferable. This system has a rotor having a large number of blades that apply mechanical action such as impact compression, friction or shearing force, a large air flow is generated by rotation of the rotor, considerable centrifugal force is applied to the graphite (A) in the mixture obtained in the aforementioned step 1 as a result thereof, and the aggregates obtained in step 2 can be compounded as a result of collisions between graphite (A) in the aggregates obtained in the aforementioned step 2 and between the graphite (A) present in the aggregates obtained the aforementioned step 2, the walls and the blades.

An example of a device used for spheroidizing treatment consists of a device that performs surface treatment by having a rotor installed with a large number of blades housed in a casing, and applying mechanical action such as impact compression, friction or shearing force to graphite present in the mixture obtained in step 1 that has been introduced therein by rotating the rotor at high speeds. Although examples thereof include a dry ball mill, wet bead mill, planetary ball mill, vibration ball mill, mechanofusion system, Agromaster (Hosokawa Micron Corp.), Hybridization System, Micros, Miralo (Nara Machinery Co., Ltd.), CF Mill (Ube Industries. Ltd.) and Theta Composer (Tokuju Corp.), preferable examples of devices include a dry ball mill, wet bead mill, planetary ball mill, vibration ball mill, mechanofusion system, Agromaster (Hosokawa Micron Corp.), Hybridization System, Micros, Miralo (Nara Machinery Co., Ltd.), CF Mill (Ube Industries, Ltd.), Theta Composer (Tokuju Corp.) and pulverizer. Among these, the Hybridization System manufactured by Nara Machinery Co., Ltd. is particularly preferable.

Furthermore, although the graphite (A) in the aggregates obtained in the aforementioned step 2 subjected to spheroidizing treatment may also be that which has already been subjected to a certain spheroidizing treatment under the conditions of a conventional method, flake graphite (A) is preferable from the viewpoint of dispersibility. In addition, the aggregates obtained in step 2 may also be repeatedly subjected to mechanical action by circulating or by going through this step a plurality of times.

Although spheroidizing treatment is carried out using this type of device, when carrying out this treatment, spheroidizing treatment is carried out at a rotor rotating speed of normally 2000 rpm or more, preferably 4000 rpm or more, more preferably 5000 rpm or more, even more preferably 6000 rpm or more and particularly preferably 6500 rpm or more, and normally at 9000 rpm or less, preferably 8000 rpm or less, more preferably 7500 rpm or less and even more preferably 7200 rpm or less, for a duration of normally 30 seconds or more, preferably 1 minute or more, more preferably 1 minute 30 seconds or more, even more preferably 2 minutes or more and particularly preferably 2 minutes 30 seconds or more, and normally for 60 minutes or less, preferably 30 minutes or less, more preferably 10 minutes or less and even more preferably 5 minutes or less.

Furthermore, if the rotor rotating speed is excessively slow, treatment for obtaining composite particles becomes ineffective and there is the possibility of an insufficient increase in degree of dispersion, while if the rotating speed is excessively fast, the effect of crushing the particles becomes more effective than the treatment for obtaining composite particles, resulting in the possibility of the particles collapsing and the degree of dispersion decreasing. Moreover, if the duration of spheroidizing treatment is excessively short, particle diameter is unable to be made sufficiently small while achieving a high degree of dispersion, while if the duration is excessively long, the graphite (A) in the aggregates obtained in step 2 is crushed, thereby resulting in the possibility of being unable to achieve the object of the present invention.

Furthermore, classification treatment may also be carried out on the resulting composite graphite particles (C). In the case the resulting composite graphite particles (C) are not within the range of the physical properties defined in the present invention, they can be made to be within a desired range of physical properties by repeatedly subjecting to classification treatment (normally for 2 to 10 times and preferably for 2 to 5 times). Although examples of classification include dry classification (air classification, screening) and wet classification, dry classification, and particularly air classification, is preferable in terms of cost and productivity.

The composite graphite particles (C) can be produced according to the production method described above.

<Carbonaceous Material-Coated Composite Graphite Particles>

Although the composite graphite particles (C) used in the present invention are obtained in the manner described above, the composite graphite particles (C) preferably contain a carbonaceous material, and a preferable specific aspect thereof consists of composite graphite particles having a carbonaceous material at least partially coated on the surface thereof (to be referred to as carbonaceous material-coated composite graphite particles).

Furthermore, in the present description, although the carbonaceous material-coated composite graphite particles are distinguished from the composite graphite particles (C) for the sake of convenience, the carbonaceous material-coated composite graphite particles are interpreted as being included in the composite graphite particles (C).

(Production Method of Carbonaceous Material-Coated Composite Graphite Particles)

The carbonaceous material-coated composite graphite particles can be produced by going through a step 4 following the previously described step 3.

Step 4: Step for coating the composite graphite particles subjected to spheroidizing treatment in step 3 with a carbonaceous material.

The following provides a detailed explanation of step 4.

(Step 4: Step for Coating Composite Graphite Particles Subjected to Spheroidizing Treatment in Step 3 with Carbonaceous Material)

Carbonaceous Material

Examples of the carbonaceous material include amorphous carbon and graphitizable carbon depending on differences in the heating temperature in the production method thereof to be subsequently described. Among these, amorphous carbon is preferable from the viewpoint of acceptable of lithium ions.

More specifically, the aforementioned carbonaceous material can be obtained by heat treating a carbon precursor thereof in the manner described below. Carbon precursors explained in the previously described section on other materials are preferably used for the aforementioned carbon precursor.

Coating Treatment

In the coating treatment, a carbon precursor for obtaining a carbonaceous material is used as a coating material for coating the composite graphite particles obtained in the aforementioned step 2, and coated graphite is obtained by their mixing and firing.

If the firing temperature is normally 600° C. or higher, preferably 700° C. or higher and more preferably 900° C. or higher, and normally 2000° C. or lower, preferably 1500° C. or lower and more preferably 1200° C. or lower, amorphous carbon is obtained as carbonaceous material. On the other hand, if heat treatment is carried out at a firing temperature of normally 2000° C. or higher, preferably 2500° C. or higher and normally 3200° C. or lower, graphitizable carbon is obtained as carbonaceous material. The amorphous carbon refers to carbon having a low degree of crystallinity, while the graphitizable carbon refers to carbon having a high degree of crystallinity.

During coating treatment, the aforementioned composite graphite particles (C) are used as a core material, the precursor carbon for obtaining a carbonaceous material is used as a coating raw material, and these are then mixed and fired to obtain carbonaceous material-coated composite graphite particles.

Furthermore, in the case of coating other resins and the like, the resin is preferably dissolved in a solvent and mixed with the composite fired in step 4 followed by blending well, washing and drying.

Mixing of Metal Particles (B) and Carbon Fine Particles

The coating layer may contain the metal particles (B) and carbon fine particles previously explained in the section on other materials.

Other Steps

In addition, the carbonaceous material-coated composite graphite particles that have gone through the aforementioned steps may undergo powder processing such as the crushing, shredding and classification treatment described in step 1.

The carbonaceous material-coated composite graphite particles of the present invention can be produced according to the production method described above.

(Physical Properties of Carbonaceous Material-Coated Composite Graphite Particles)

Although the carbonaceous material-coated composite graphite particles demonstrate the same physical properties as those of the previously described composite graphite particles, those preferable physical properties of the carbonaceous material-coated composite graphite particles that are particularly altered by coating treatment are described below.

d Value of Interplanar Spacing of (002) Plane

The d value of interplanar spacing of the (002) plane of the carbonaceous material-coated composite graphite particles as determined by wide-angle X-ray diffraction is normally 0.336 nm or more, preferably 0.337 nm or more, more preferably 0.340 nm or more and even more preferably 0.342 nm or more. In addition, the d value is normally less than 0.380 nm, preferably 0.370 nm or less and more preferably 0.360 nm or less. An excessively large d002 value results in the demonstration of low crystallinity and cycling characteristics tend to decrease, while if the d002 value is excessively small, it becomes difficult to obtain the effect of compounding the carbonaceous material.

Coverage Factor

Although the carbonaceous material-coated composite graphite particles are coated with amorphous carbon or graphitizable carbon, coating with amorphous carbon is preferable from the viewpoint of acceptability of lithium ions, and the coverage factor thereof is normally 0.5% or more, preferably 1% or more, more preferably 3% or more, even more preferably 4% or more, particularly preferably 5% or more and most preferably 6% or more, and normally 30% or less, preferably 25% or less, more preferably 20% or less, even more preferably 15% or less, particularly preferably 10% or less and most preferably 8% or less. If this content is excessively high, the amorphous carbon portion of the negative electrode material becomes excessively large and reversible capacity when incorporating in a battery tends to decrease. If the content is excessively low, in addition to amorphous carbon sites not being uniformly coated on the graphite particles serving as cores, solid granulation does not occur and particle diameter tends to be excessively small during crushing after firing.

Furthermore, the content of carbide derived from organic compounds in the ultimately obtained carbon material for an electrode (coverage factor) can be calculated using the following equation (3) based on the amount of raw material carbon used, the amount of organic compound, and the residual carbon ratio measured according to the micro method in compliance with JIS K2270-02 (2009).

Equation (3)

Coverage factor of carbide derived from organic compound (%)=(weight of organic compound×residual carbon ratio×100)/{weight of raw material carbon+(weight of organic compound×residual carbon ratio)}

<Other Mixtures>

Although the composite graphite particles (C) of the present invention can be used alone as an active material for a nonaqueous secondary battery negative electrode, it is preferably used for the active material of a nonaqueous secondary battery negative electrode by further containing one or more types of materials selected from the group consisting of natural graphite, artificial graphite, vapor-grown carbon fibers, electrically conductive carbon black, carbonaceous material-coated graphite, resin-coated graphite, amorphous carbon and materials obtained by subjecting these materials to suitable treatment that have different forms and physical properties from the aforementioned composite graphite particles (C). Among these, an active material for a nonaqueous secondary battery negative electrode containing the composite graphite particles (C) of the present invention and one or more types of materials selected from the group consisting of natural graphite, artificial graphite, carbonaceous material-coated graphite, resin-coated graphite and amorphous carbon is more preferable.

As a result of suitably selecting and mixing carbonaceous particles having different forms and physical properties, cycling characteristics can be improved as a result of improving electrical conductivity, charge acceptance can be improved, irreversible capacity can be decreased and rollability can be improved.

The mixing ratio of the composite graphite particles (C) to the total amount of composite graphite particles (C) and carbonaceous particles having a form and properties different therefrom is normally 1% by weight or more, preferably 1.5% by weight or more, more preferably 2% by weight or more, and even more preferably 2.5% by weight or more. In addition, the mixing ratio is normally 99% by weight or less, preferably 95% by weight or less, more preferably 90% by weight or less and even more preferably 85% by weight or less.

If the amount of composite graphite particles (C) is excessively high, volume expansion accompanying charging and discharging increases, deterioration of capacity becomes prominent and press load may decrease. In addition, if the amount of composite graphite particles (C) is excessively low, adequate capacity tends to not be obtained.

Among those carbonaceous particles having different form and properties, highly purified flake graphite or spheroidized graphite, for example, can be used as natural graphite.

Particles obtained by compounding coke powder or natural graphite with a binder or particles obtained by firing and graphitizing single graphite precursor particles while still in the form of a powder, for example, can be used as artificial graphite.

Particles obtained by coating a carbonaceous material precursor onto natural graphite or artificial graphite followed by firing, or particles obtained by coating a carbonaceous material onto the surface of natural graphite or artificial graphite, for example, can be used as carbonaceous material-coated graphite.

Particles obtained by coating a polymeric material onto natural graphite or artificial graphite followed by drying, for example, can be used as resin-coated graphite, while particles obtained by firing bulk mesophase or particles obtained by subjecting a carbonaceous material precursor to infusibilization treatment followed by firing, for example, can be used as amorphous carbon.

<Negative Electrode for Nonaqueous Secondary Battery>

In order to fabricate a negative electrode using an active material for a nonaqueous secondary battery negative electrode containing the composite graphite particles (C) according to the present invention, a mixture obtained by incorporating a binder resin in an active material for a nonaqueous secondary battery negative electrode is formed into a slurry with water or organic solvent, followed by coating onto a current collector after adding a thickener as necessary and drying.

A binder resin that is stable in nonaqueous electrolytic solution and is non-water-soluble is preferably used for the binder resin. Examples thereof include rubber-like polymers such as styrene, butadiene rubber, isoprene rubber or ethylene-propylene rubber, synthetic resins such as polyethylene, polypropylene, polyethylene terephthalate or aromatic polyamides, thermoplastic elastomers such as styrene-butadiene-styrene block copolymers and hydrogenated products thereof, styrene-ethylene-butadiene-styrene copolymers or styrene-isoprene-styrene block copolymers and hydrogenated products thereof, soft resin-like polymers such as syndiotactic 1,2-polybutadiene, ethylene-vinyl acetate copolymer or copolymers of ethylene and α-olefins having 3 to 12 carbon atoms, and fluorinated polymers such as polyvinylidene fluoride, polypentafluorpropylene or polyhexafluoropropylene. Examples of organic solvents include NMP and DMF.

The binder resin is used at preferably 0.1% by weight and more preferably 0.2% by weight based on the active material for a nonaqueous secondary battery negative electrode. By making the ratio of binder resin to active material for a nonaqueous secondary battery negative electrode to be 0.1% by weight or more, mutual adhesion between active materials for a nonaqueous secondary battery negative electrode and adhesion between the composite graphite particles and current collector are adequate, thereby making it possible to prevent reductions in battery capacity and exacerbation of cycling characteristics caused by the active material for a nonaqueous secondary battery negative electrode dissociating from the negative electrode. The binder resin is preferably used at 10% by weight at most and preferably at 7% by weight or less.

Examples of thickeners added to the slurry include water-soluble celluloses such as carboxymethyl cellulose, methyl cellulose, hydroxyethyl cellulose or hydroxypropyl cellulose, as well as polyvinyl alcohol and polyethylene glycol. Among these, carboxymethyl cellulose is preferable. The thickener is used at preferably 0.2% by weight to 10% by weight and more preferably at 0.5% by weight to 7% by weight based on the composite graphite particles.

A material conventionally known to be able to be used in this application is used for the negative electrode current collector, and examples thereof include copper, copper alloys, stainless steel, nickel, titanium and carbon. The shape of the current collector is normally that of a sheet, and preferably has surface irregularities on the surface thereof and preferably uses a metal mesh or perforated metal.

After having coated a slurry of the active material for a nonaqueous secondary battery negative electrode and the binder resin onto the current collector followed by drying, the coated slurry is preferably pressured to increase the density of the negative electrode active material layer formed on the current collector, resulting in an increase in the battery capacity per unit volume of the negative electrode active material layer. The density of the negative electrode active material layer is preferably 1.2 $g/cm^3$ or more and more preferably 1.3 $g/cm^3$ or more, and preferably 1.9 $g/cm^3$ or less and more preferably 1.8 $g/cm^3$ or less. As a result of making the density of the negative electrode active material layer to be 1.2 $g/cm^3$ or more, decreases in battery capacity accompanying increases in electrode thickness can be prevented. As a result of making the density of the negative electrode active material layer to be 1.8 $g/cm^3$ or less, reductions in the amount of electrolytic solution retained in voids accompanying reductions in inter-particle voids in the electrode, and decreases in rapid charge-discharge characteristics attributable to decreased mobility of alkaline ions such as lithium (Li) ions, can be prevented.

<Nonaqueous Secondary Battery>

The nonaqueous secondary battery according to the present invention can be fabricated in accordance with ordinary methods with the exception of using the aforementioned negative electrode. Lithium transition metal complex oxides such as lithium cobalt complex oxide having a basic composition represented by $LiCoO_2$, a lithium nickel complex oxide represented by $LiNiO_2$ or a lithium manganese complex oxide represented by $LiMnO_2$ or $LiMn_2O_4$, transition metal oxides such as manganese dioxide, mixed complex oxides thereof as well as $TiS_2$, $FeS_2$, $Nb_3S_4$, $Mo_3S_4$, $CoS_2$, $V_2O_5$, $CrO_3$, $V_3O_3$, $FeO_2$, $GeO_2$ or $LiNi_{0.33}Mn_{0.33}O_2$ may be used for the positive electrode material.

The positive electrode can be fabricated by forming a mixture incorporating a binder resin in these positive electrode materials into a slurry with a suitable solvent, and coating the slurry onto a current collector followed by drying. Furthermore, the slurry preferably contains an electrically conductive material such as acetylene black or Ketjen black.

In addition, a thickener may also be contained as desired. Examples of thickeners and binder resins that may be used include commonly known thickeners and binders used in this application, such as those used to fabricate a negative electrode.

The mixing ratio of the electrically conductive material based on the positive electrode material is normally 0.5% by weight to 20% by weight and particularly preferably 1% by weight to 15% by weight. The mixing ratio of the thickener is preferably 0.2% by weight to 10% by weight and more preferably 0.5% by weight to 7% by weight. The mixing ratio of the binder resin when forming a slurry with water is preferably 0.2% by weight to 10% by weight and more preferably 0.5% by weight to 7% by weight. In addition, the mixing ratio of a binder resin such as NMP when forming a slurry with an organic solvent is preferably 0.5% by weight to 20% by weight and more preferably 1% by weight to 15% by weight.

Aluminum, titanium, zirconium, hafnium, niobium, tantalum or an alloy thereof may be used for the positive electrode current collector.

Among these, aluminum, titanium, tantalum or an alloy thereof is used preferably, and aluminum and/or an alloy thereof are used most preferably.

An electrolytic solution obtained by dissolving various lithium salts in a conventionally known nonaqueous solvent can be used for the electrolytic solution. Examples of nonaqueous solvents include cyclic carbonates such as ethylene carbonate, fluoroethlene carbonate, propylene carbonate, butylene carbonate or vinylene carbonate, linear carbonates such as dimethyl carbonate, ethyl methyl carbonate or diethyl carbonate, cyclic esters such as γ-butyrolactone, cyclic ethers such as crown ether. 2-methyltetrahydrofuran, tetrahydrofuran, 1,2-dimethyltetrahydrofuran or 1,3-dioxolane, and linear ethers such as 1,2-dimethoxyethane. Normally several of these solvents are used in combination. Among these, cyclic carbonates, linear carbonates and those used in combination with other solvents are preferable.

In addition, compounds such as vinylene carbonate, vinyl ethylene carbonate, succinic anhydride, maleic anhydride, propane sultone or diethylsulfone, or difluorophosphates in the manner of lithium difluorophosphate, may also be added. Moreover, overcharge preventive agents such as diphenyl ether or cyclohexylbenzene may also be added.

Examples of electrolytes dissolved in nonaqueous solvent that may be used include $LiClO_4$, $LiPF_6$, $LiBF_4$, $LiCF_3SO_3$. $LiN(CF_3SO_2)_2$, $LiN(CF_3CF_2SO_2)_2$. $LiN(CF_3SO_2)(C_4F_9SO_2)$ and $LiC(CF_3SO_2)_3$. The concentration of electrolyte in the electrolytic solution is normally 0.5 mol/l to 2 mol/l and preferably 0.6 mol/l to 1.5 mol/l.

A porous sheet composed of a polyolefin such as polyethylene or polypropylene, or a non-woven fabric, is preferably used for the separator interposed between the positive electrode and negative electrode.

The capacity ratio of negative electrode/positive electrode in the nonaqueous secondary battery according to the present invention is preferably designed to be 1.01 to 1.5 and more preferably designed to be 1.2 to 1.4.

The nonaqueous secondary battery is preferably a lithium ion secondary battery provided with a positive electrode and negative electrode, capable of occluding and releasing lithium ions, and an electrolyte.

EXAMPLES

Although the following provides a more detailed explanation of specific aspects of the present invention through examples thereof, the present invention is not limited by these examples.

Furthermore, measurement of the volume mean particle diameter (d50), BET specific surface area, Si content of the composite graphite particles and Si degree of dispersion of the composite graphite particles in the present description was carried out according to the methods indicated below.

Volume Mean Particle Diameter (d50)

Volume mean particle diameter (d50) was determined by adding about 20 mg of carbon powder to 1 ml of a 2% aqueous solution of polyoxyethylene (20) sorbitan monolaurate followed by dispersing this in about 200 ml of ion exchange water, and measuring volume particle size distribution of the resulting dispersion using a laser diffraction particle size distribution analyzer (LA-920, Horiba, Ltd.) to determine median diameter (d50). Measurement conditions consisted of ultrasonic dispersion for 1 minute, ultrasonic intensity of 2, circulating speed of 2 and relative refractive index of 1.50.

BET Specific Surface Area (SA)

BET specific surface area (SA) was measured using the Tristar II300 manufactured by Micromeritics Japan G.K. After vacuum drying for 1 hour at 150° C., BET specific surface area was measured according to the BET multipoint method using nitrogen gas adsorption (by measuring 5 points within a relative pressure range of 0.05 to 0.30).

Tapped Density of Composite Graphite Particles

Tapped density of the composite graphite particles was determined by dropping a sample through a sieve having an opening size of 300 μm into a cylindrical tapping cell having a diameter of 1.6 cm and volume capacity of 20 cm³ using a powder density tester and completely filling the cell, followed by tapping 1000 times at a stroke length of 10 mm and determining density from the volume and sample weight at that time.

Si Content of Composite Graphite Particles

Si content of the composite graphite particles was determined by completely melting a sample (composite graphite particles) with base followed by dissolving with water and bringing to a constant volume, measuring with an inductively-coupled plasma emission spectrometer (Ultima 2C, Horiba, Ltd.) and calculating the amount of Si from a calibration curve. Subsequently, the Si content of the composite graphite particles was calculated by dividing the amount of Si by the weight of the composite graphite particles.

Degree of Dispersion of Si in Composite Graphite Particles

The degree of dispersion of Si in the composite graphite particles was measured in the manner indicated below. A polar plate similar to the polar plate used to fabricate a battery for evaluating performance as described below was used for the polar plate containing composite graphite particles. First, a cross-section of the electrode was processed using a cross-section polisher (IB-09020CP, JEOL Ltd.). The graphite (A) and Si were mapped using reflected electron images while observing the processed electrode cross-section with an SEM (SU-70. Hitachi High-Technologies Corp.). Furthermore, conditions for acquiring the SEM cross-section consisted of an accelerating voltage of 3 kV and magnification factor of 1000×, and images were obtained over a range capable of acquiring a single particle at a resolution of 256 dpi. Subsequently. 100 particles were extracted using two SEM images measuring 150 μm×100 μm in accordance with the measurement method and conditions for degree of dispersion described above, and 10 particles were selected therefrom that satisfy the aforementioned degree of dispersion measurement conditions to calculate degree of dispersion using the y/x values of 5 random particles.

Example 1

(Preparation of Composite Graphite Particles (C))
(Step 1)

First, metal particles (B) in the form of polycrystalline Si having a mean particle diameter d50 of 1 μm were crushed to a mean particle diameter d50 of 0.2 μm with an LMZ10 (Ashizawa Finetech Ltd.) to prepare an Si slurry (1). 300 g of this Si slurry (1) (solid content: 40% by weight) were added to 1500 g of NMP without allowing to dry followed by stirring using a mixing stirrer (Dalton Co., Ltd.). Next. 1000 g of graphite (A) in the form of natural flake graphite (mean particle diameter d50: 9 μm) were added followed by mixing using a mixing stirrer at an NV ratio of 40% by weight to obtain a slurry (II) in which Si compound particles and graphite were uniformly dispersed therein.

(Step 2)

This slurry (II) was dried under reduced pressure at 150° C. until the solvent residue became 10% by weight based on the charged amounts of the graphite (A) and metal particles (B). The resulting aggregates were crushed with a mill having a hammer-shaped head (IKA Corp.).

(Step 3)

The crushed aggregate was charged into a hybridization system (Nara Machinery Co., Ltd.) followed by subjecting to spheroidizing treatment by circulating or retaining in a device at a rotor rotating speed of 7000 rpm for 180 seconds to obtain composite graphite particles (C) having Si compound particles enclosed therein.

(Step 4)

The resulting composite graphite particles (C) containing Si compound particles were mixed with coal-based heavy oil so as to have a coverage factor after firing of 7.5% followed by kneading and dispersing with a biaxial kneader. The resulting dispersion was introduced into a firing furnace and fired for 1 hour at 1000° C. in a nitrogen atmosphere. The fired block was crushed under conditions of a rotating speed of 3000 rpm using the aforementioned mill followed by classifying with a vibration sieve having an opening size of 45 μm to obtain composite graphite particles (C) coated with amorphous carbon.

Figure 2:
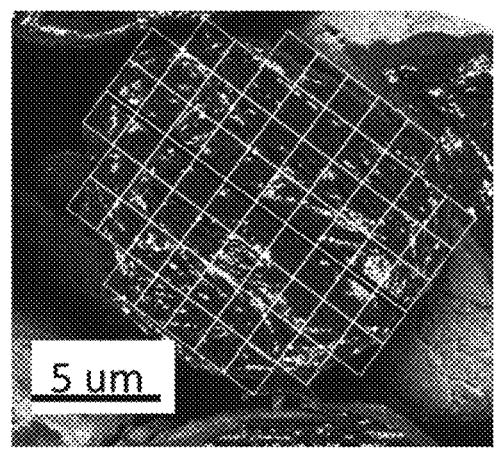
FIG. 2 is a scanning electron microscope (SEM) image of a cross-section of composite graphite particles of Example 1.

The mean particle diameter (d50), BET specific surface area, Si content, Si degree of dispersion and tapped density of the resulting composite graphite particles are described in Table 1. Furthermore, a cross-sectional SEM image of the composite graphite particles (C) is shown in FIG. 2.

When the cross-sectional structure was observed in the cross-sectional SEM image, the degree of dispersion of Si in the composite graphite particles (C) was 0.96 and Si dispersibility was confirmed to be high.

Evaluation of Battery Characteristics

A battery evaluation (consisting of evaluations of discharge capacity, initial charge-discharge efficiency and discharge C rate characteristics) was carried out on the resulting composite graphite particles (C). The results of the battery evaluation are shown in Table 1.

(Fabrication of Battery for Performance Evaluation)

97.5% by weight of the aforementioned composite graphite particles (C), 1% by weight of a binder in the form of carboxymethyl cellulose (CMC), and 1.5% by weight of a 48% by weight aqueous dispersion of styrene-butadiene rubber (SBR) were kneaded with a hybridizing mixer to obtain a slurry. This slurry was coated onto rolled copper foil having a thickness of 18 μm to a basis weight of 4 mg/cm$^2$ to 5 mg/cm$^2$ by blade coating followed by drying.

Subsequently, the coated copper foil was roll-pressed to a density of the negative electrode active material layer of 1.3 g/cm$^3$ to 1.5 g/cm$^3$ with a 250 mm diameter roll press equipped with a load cell followed by punching into a circular shape having a diameter of 12.5 mm and vacuum drying for 2 hours at 110° C. to obtain a negative electrode for evaluation. The aforementioned negative electrode and Li foil serving as the counter electrode were superimposed with a separator impregnated with an electrolytic solution interposed there between to fabricate a battery for charge-discharge testing. An electrolytic solution obtained by dissolving fluoroethylene carbonate to 10% by weight and LiPF$_6$ to 1.2 mol/l in a mixed solvent of ethylene carbonate and ethyl methyl carbonate (weight ratio: 3/7) was used for the electrolytic solution.

(Discharge Capacity/Initial Charge-Discharge Efficiency)

First, the aforementioned battery was charged to 5 mV relative to the positive electrode and negative electrode at a current density of 0.8 mA/cm$^2$, further charged at a constant voltage of 5 mV until the current value reached 0.08 mA, and after doping the negative electrode with lithium, the battery was discharged to 1.5 V relative to the positive electrode and negative electrode at a current density of 0.8 mA/cm$^2$. The weight of the negative active material was determined by subtracting the weight of copper foil punched out to the same area as the negative electrode from the weight of the negative electrode, and the discharge capacity of the first cycle was divided by this weight of the negative electrode active material to determine the initial charge-discharge capacity per unit weight which was then used as discharge capacity.

Next, the battery was charged and discharged under the same conditions, and after determining the discharge capacity per unit weight of the second cycle, initial charge-discharge efficiency was determined using equation (4) indicated below.

Equation (4)

$$\text{Initial charge-discharge efficiency (\%)} = \{\text{discharge capacity of second cycle (mAh/g)}/(\text{discharge capacity of first cycle (mAh/g)}\} \times 100$$

(Discharge C Rate Characteristics)

The battery for which initial charge-discharge efficiency was determined above was charged to 5 mV relative to the positive electrode and negative electrode at a current density of 0.8 mA/cm$^2$, and further charged at a constant voltage of 5 mV until the current value reached 0.08 mA. This battery was then discharged to 1.5 V relative to the positive electrode and negative electrode at a current density of 0.8 mA/cm$^2$. Next, after charging this battery in the same manner, the battery was discharged to a current density of 4.0 mA/cm$^2$. Discharge C rate was determined according to equation (5) below using each discharge capacity.

Equation (5)

$$\text{Discharge C rate (\%)} = \text{capacity during discharge at } 4.0 \text{ mA/cm}^2/\text{capacity during discharge at } 0.8 \text{ mA/cm}^2 \times 100$$

Example 2

Composite particles were obtained using the same method as Example 1 with the exception of adding 30 g of polyacrylonitrile to inhibit dissociation of metal particles when mixing the slurry (II), and using natural flake graphite (mean particle diameter d50: 13 μm) for the graphite (A). The properties of the resulting composite graphite particles and the results of battery evaluation are described in Table 1.

Example 3

Composite particles were obtained using the same method as Example 1 with the exception of using natural flake graphite (mean particle diameter d50: 15 μm) for the graphite (A). The properties of the resulting composite graphite particles and the results of battery evaluation are described in Table 1.

Comparative Example 1

Composite particles were obtained using the same method as Example 1 with the exception of using a slurry obtained by additionally drying the slurry (II) used in step 1 having graphite uniformly dispersed therein so that solvent residue became 0.5% by weight or less based on the charged amounts of the graphite (A) and metal particles (B). The properties of the resulting composite graphite particles and the results of battery evaluation are described in Table 1.

Comparative Example 2

Figure 3:
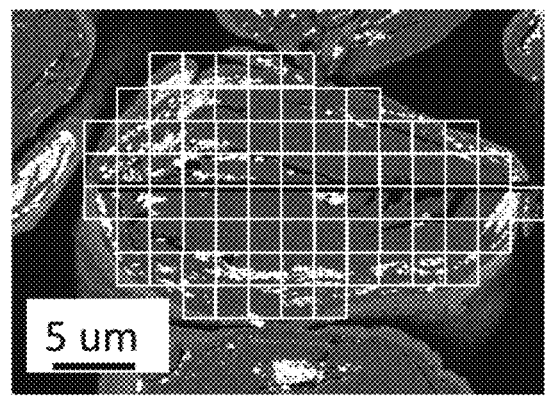
FIG. 3 is a scanning electron microscope (SEM) image of a cross-section of composite graphite particles of Comparative Example 2.

Composite particles were obtained using the same method as Example 1 with the exception of changing the size of the flake graphite used in step 1 to 45 μm. The properties of the resulting composite graphite particles and the results of battery evaluation are described in Table 1. In addition, an SEM image of the cross-section of the composite graphite particles is shown in FIG. 3.

Comparative Example 3

The Si slurry (I) (solid content: 40% by weight) was dried to obtain Si compound particles. After mixing 190 g of the Si compound particles and 1000 g of spherical graphite particles (mean particle diameter d50: 16 μm), mixing with coal tar pitch and firing were carried out using the same procedure as that of Example 1. The properties of the resulting composite graphite particles and the results of battery evaluation are described in Table 1.

Comparative Example 4

Coal tar pitch was added in step 1 in an amount such that the coverage factor after firing was 7.5 parts by weight. Subsequently, after firing for 2 hours at 400° C. in a nitrogen atmosphere, the particles were crushed to a particle size of 10 μm. Following crushing, 200 g of the fired powder were treated with a mechanofusion system (Hosokawa Micron Corp.) for 20 minutes at 2000 rpm. After firing at 1000° C., the fired block was crushed using the previously described mill under conditions of a rotating speed of 3000 rpm followed by classifying with a vibration sieve having an opening size of 45 μm to obtain composite graphite particles (C) coated with amorphous carbon. The properties of the resulting composite graphite particles and the results of battery evaluation are described in Table 1.

TABLE 1

| | d50 (μm) | SA (m$^2$/g) | TAP (g/cm$^3$) | Degree of dispersion | Discharge C rate | Initial charge-discharge efficiency (%) |
|---|---|---|---|---|---|---|
| Example 1 | 11 | 7.6 | 0.923 | 0.96 | 0.993 | 87.2 |
| Example 2 | 11 | 9.2 | 0.984 | 0.90 | 0.993 | 85.9 |
| Example 3 | 15 | 6.8 | 0.98 | 0.80 | 0.988 | 89.4 |
| Comparative Example 1 | 10 | 6.2 | 0.875 | 0.75 | 0.982 | 86.8 |
| Comparative Example 2 | 20 | 13 | 1.05 | 0.66 | 0.990 | 86.4 |
| Comparative Example 3 | 19 | 8.3 | 1.03 | 0.4 | 0.855 | 85.6 |
| Comparative Example 4 | 10 | 6.8 | 0.695 | 0.56 | 0.988 | 86.6 |

As shown in Table 1, the composite graphite particles (C) of the present invention were confirmed to have high discharge C rate characteristics. In addition, they were also confirmed to have high initial charge-discharge efficiency. In particular, Examples 1 and 2 having favorable degrees of dispersion were confirmed to demonstrate extremely high discharge C rate characteristics. In addition, Examples 1 and 3, in which degree of dispersion and specific surface area were within preferable ranges, were determined to demonstrate superior initial charge-discharge efficiency while maintaining a high C rate. This is thought to be because, since the composite graphite particles (C) of the present invention have Si present within the particles in a highly dispersed state, there is little interruption of electron conductive paths caused by local expansion, thereby resulting in balance between discharge C rate characteristics and initial charge-discharge efficiency at a high level.

Although a detailed explanation of the present invention has been provided with reference to specific embodiments, it should be clear to a person with ordinary skill in the art that various alterations and modifications can be added without deviating from the spirit and scope of the present invention.

INDUSTRIAL APPLICABILITY

A nonaqueous secondary battery provided with an electrode using the composite graphite particles of the present invention has high capacity and demonstrates improved initial charge-discharge characteristics and charge-discharge efficiency, thereby making it industrially useful as a resulting of being able to satisfy the properties required of applications in cell phones, power tools and electric automobiles in recent years.

BRIEF DESCRIPTION OF THE REFERENCE SYMBOLS (1) Solid line: Extracted composite graphite particle (C)
(2) Metal particle (B)
(3) Center of gravity
(4) Dotted line: Long axis of extracted particle
(5) Dotted line: Short axis of extracted particle
(6) Lattice having square-shaped squares

The invention claimed is:

1. A method to produce composite graphite particles for a nonaqueous secondary battery negative electrode, the composite graphite particles comprising:
  graphite (A) and metal particles capable of alloying with Li (B), wherein a degree of dispersion of the metal particles (B) in the composite graphite particles is 0.78 or more;
  the method comprising:
  preparing a slurry containing an aggregate of the graphite (A) and the metal particles (B);
  drying the aggregate slurry such that a residue of 5% or more of solvent remains therein; and
  carrying out spheroidizing treatment of the aggregate slurry with the solvent residue still contained in the slurry;
  wherein the degree of dispersion is defined by the following measurement method:
  when a lattice is drawn in the form of a grid having a length of 2 μm per side (however, length per side A/10 μm in the case the length of the long axis <20 μm) for each of the images of the scanning electron microscope (SEM) of the cross-sections of 10 composite graphite particles satisfying the following condition:

$[0.5 \times (A+B)R] \leq 3$, wherein, A represents the length of the long axis (μm), B represents the length of the short axis (μm), and R represents the mean particle diameter d50 (μm), the number of squares in the lattice that contain composite graphite particles are defined as x, and the number of squares in the lattice containing composite graphite particles that also contain metal particles are defined as y, then the values of y/x for any 5 particles are calculated, and the average value thereof is defined as the degree of dispersion.

2. The method according to claim 1, wherein a content of solvent residue in the aggregate after drying is 40% by weight or less.

3. The production method according to claim 1, wherein a volume mean particle diameter (d50) of the graphite (A) is 20 μm or less.

4. The production method according to claim 2, wherein a volume mean particle diameter (d50) of the graphite (A) is 20 μm or less.

* * * * *